US012677848B2

(12) United States Patent
Markosyan et al.

(10) Patent No.: US 12,677,848 B2
(45) Date of Patent: Jul. 14, 2026

(54) STEVIA FLAVOR COMPOSITIONS

(71) Applicant: PURECIRCLE USA INC., Westchester, IL (US)

(72) Inventors: Avetik Markosyan, Kuala Lumpur (MY); Saravanan A/L Ramandach, Negeri Sembilan (MY); Mohamad Afzaal Bin Hasim, Kuala Lumpur (MY); Khairul Nizam Bin Nawi, Negeri Sembilan (MY); Siew Yin Chow, Selangor (MY); Siddhartha Purkayastha, Chicago, IL (US)

(73) Assignee: PureCircle USA Inc., Westchester, IL (US)

( * ) Notice: Subject to any disclaimer, the term of this patent is extended or adjusted under 35 U.S.C. 154(b) by 1200 days.

(21) Appl. No.: 17/611,736

(22) PCT Filed: May 17, 2020

(86) PCT No.: PCT/US2020/033343
§ 371 (c)(1),
(2) Date: Nov. 16, 2021

(87) PCT Pub. No.: WO2020/236684
PCT Pub. Date: Nov. 26, 2020

(65) Prior Publication Data
US 2022/0232860 A1 Jul. 28, 2022

Related U.S. Application Data

(60) Provisional application No. 62/850,345, filed on May 20, 2019, provisional application No. 62/849,821, filed on May 17, 2019.

(51) Int. Cl.
*A23L 2/60* (2006.01)

(52) U.S. Cl.
CPC ..................................... *A23L 2/60* (2013.01)

(58) Field of Classification Search
CPC . A23L 33/18; A23L 2/60; A23L 33/16; A23K 50/40
See application file for complete search history.

(56) References Cited

U.S. PATENT DOCUMENTS

2019/0133167 A1 5/2019 Markosyan

FOREIGN PATENT DOCUMENTS

WO 2019177634 A1 9/2019
WO 2019178541 A1 9/2019

OTHER PUBLICATIONS

Executive Summary—Application to Amend the Specifications for Steviol Glycosides to Include a New Manufacturing Method for Selected Steviol Glycosides from Stevia Leaf Extracts with Highly Purified Stevioside and Rebaudioside, PureCircle Limited, Food Standards Australia New Zealand, Mar. 13, 2019 (Mar. 13, 2019), pp. 1-5. Retrieved from Internet: https://www.foodstandards.gov.au/code/applications/Documents/A1176%20Executiv%20Summary.pdf> on Jul. 22, 2020 (Jul. 22, 2020).

(Continued)

*Primary Examiner* — Vera Stulii

(57) ABSTRACT

*Stevia* flavor compositions comprising a high level of reb audioside AM (Reb AM) are described. These compositions are flavors with modifying properties, or FMPs. Using an FMP, certain flavor notes in a consumable product may be enhanced, while other flavor notes may be suppressed.

6 Claims, 12 Drawing Sheets

Specification includes a Sequence Listing.

(56) References Cited

OTHER PUBLICATIONS

Executive Summary—Application to Amend Schedule 15 of the Australia New Zealand Food Standards Code to Allow the Addition of Steviol Glycosides in Fruit Australian Beverages Council Ltd., Food Standards Australia New Zealand, Jun. 1, 2017 (Jun. 1, 2017), pp. 1-6. Retrieved from Internet: https://www.foodstandards.gov.au/code/applications/Documents/A1149%20Exec%20Summary.pdf> on Jul. 21, 2020 (Jul. 21, 2020).

FIG. 5: Effect of PCS-3028 on flavor modification of Coconut Water

FIG. 6: Effect of PCS-3028 on flavor modification of Chocolate Protein shake

FIG. 7: Effect PCS-3028 on flavor modification of Vanilla Cinnamon Oatmilk

FIG. 8: Effect of PCS-3028 on flavor modification of Strawberry Jam/ Fruit Prep

FIG. 11: Effect of PCS 3028 on flavor modification of Moscow Mule
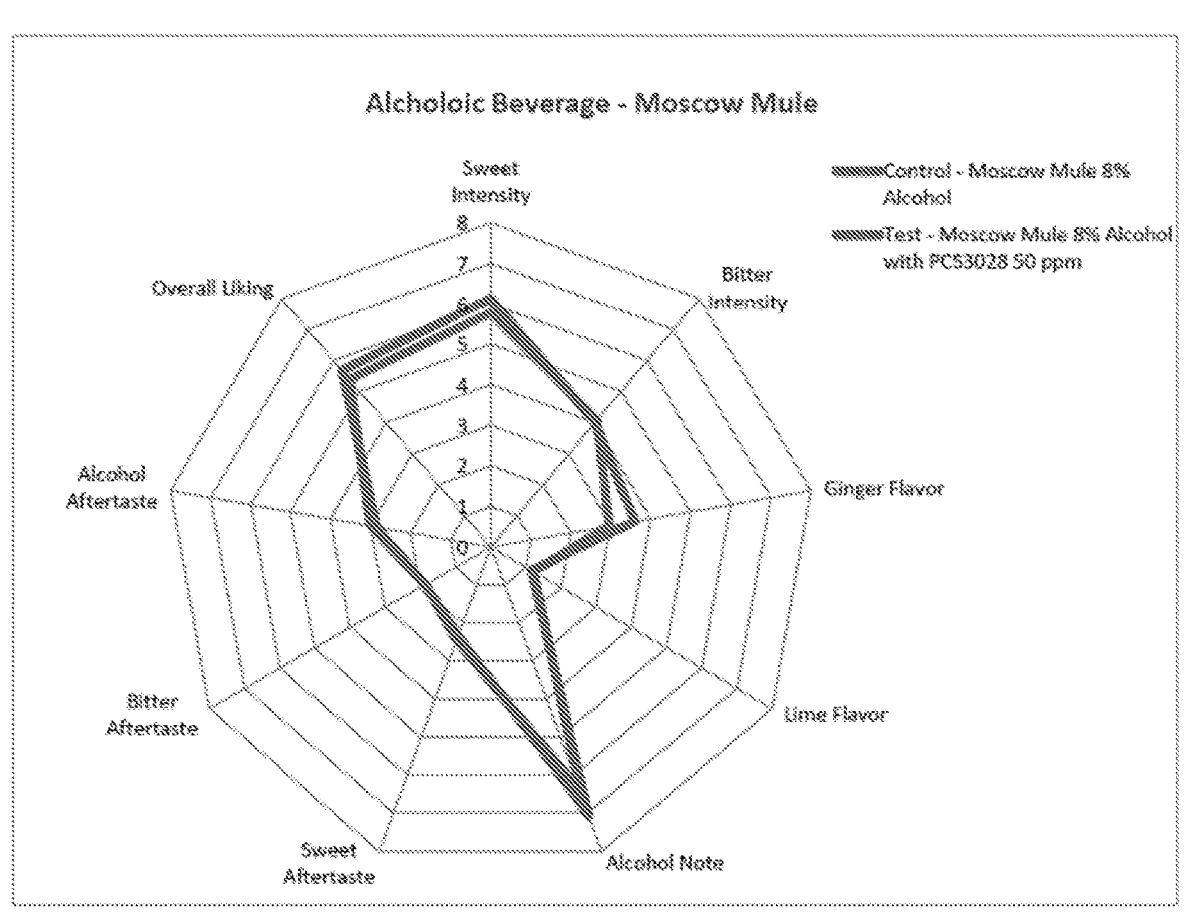

FIG. 12: Effect of PCS-3028 on flavor modification of Corn puffs
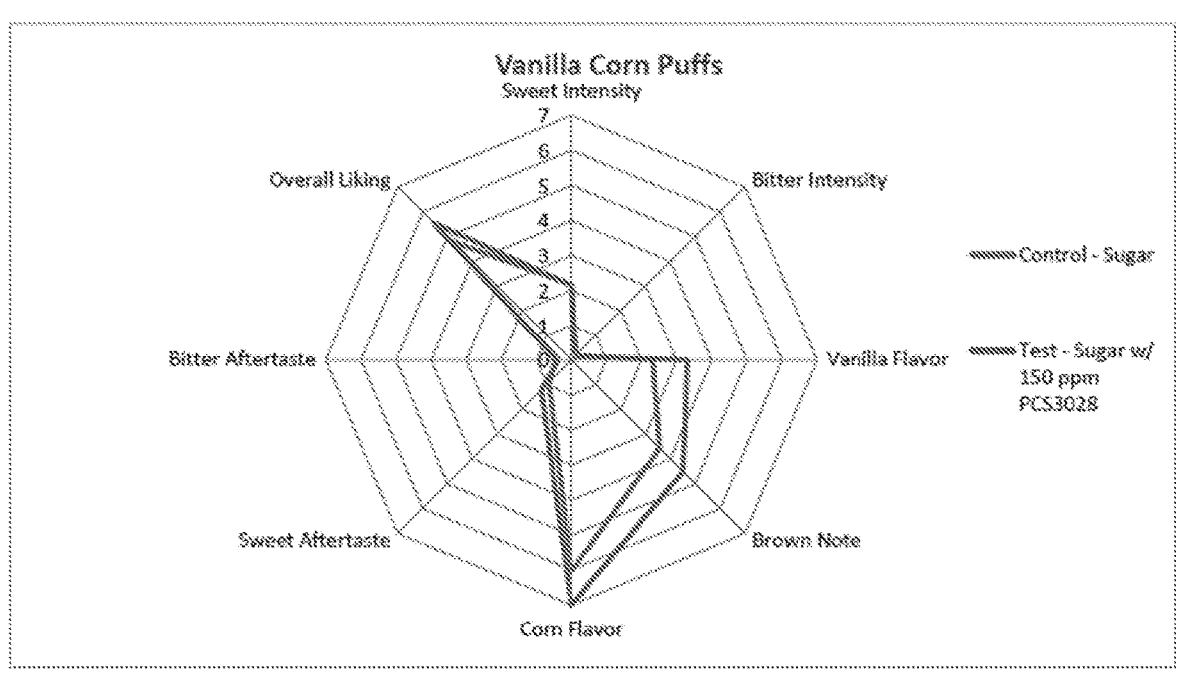

STEVIA FLAVOR COMPOSITIONS

RELATED APPLICATIONS

This application is a U.S. national stage entry under 35 U.S.C. § 371 of International Patent Application No. PCT/US2020/033343, filed May 17, 2020, which claims priority under 35 U.S.C. § 119 (e) to U.S. Provisional Patent Application No. 62/849,821, filed May 17, 2019 and U.S. Provisional Patent Application No. 62/850,345, filed May 20, 2019, the contents of which applications are herein incorporated by reference.

This patent application incorporates by reference each of the following in their entirety: International Patent Application No. PCT/US2019/022581, filed on Mar. 15, 2019; International Patent Application No. PCT/US2019/022456, filed on Mar. 15, 2019; U.S. Provisional Application No. 62/806,646, filed on Feb. 15, 2019; U.S. Provisional Application No. 62/802,111, filed on Feb. 6, 2019; U.S. Provisional Application No. 62/771,937, filed on Nov. 27, 2018; U.S. Provisional Application No. 62/682,461, filed on Jun. 8, 2018; International Patent Application No. PCT/US2018/026920, filed on Apr. 10, 2018; U.S. Provisional Application No. 62/644,407, filed on Mar. 17, 2018; and U.S. Provisional Application No. 62/644,065, filed on Mar. 16, 2018.

SEQUENCE LISTING

The text file entitled "PC_77WO_Final_ST25.txt," created on Apr. 10, 2018, having 15 kilobytes of data, and filed concurrently herewith, is hereby incorporated by reference in its entirety in this application.

SUMMARY OF THE INVENTION

The present invention is directed to novel *stevia* flavor compositions comprising a high level of rebaudioside AM (Reb AM). These compositions are flavors with modifying properties, or FMPs. An FMP is a flavor ingredient that modifies the flavor profile of a consumable product without imparting detectable sweetness to the product. Using an FMP, certain flavor notes in a consumable product can be enhanced, while other flavor notes may be suppressed.

The chemical structure of Reb AM is shown in FIG. 1.

The high level of Reb AM is obtained in the compositions by a bioconversion process to convert certain steviol glycoside molecules into Reb AM. The compositions have a total steviol glycoside content that is greater than or equal to about 80%, preferably greater than or equal to about 90% and more preferably greater than or equal to about 95%. The Reb AM content in the composition can range from greater than 10%, or greater than 50%, preferably greater than about 65%, and more preferably greater than about 70% In certain embodiments, the Reb AM content is about 68%, or about 72%, or about 75%. In other embodiments, the Reb AM content ranges from about 10-85%. Other levels of Reb AM content are encompassed by this invention.

The ratio of Reb AM to Reb M in the *stevia* flavor compositions may range, on a percent dry weight basis, from about 1:1 to about 10:1, preferably from about 2:1 to about 7:1, and more preferably from about 3:1 to about 5:1. In certain embodiments, the Reb AM to Reb M dry weight ratio is about 3.7:1, or about 4.8:1, or about 4.3:1. Other percent dry weight ratios of Reb AM to Reb M in the *stevia* flavor composition are contemplated by this invention.

The balance of the *stevia* flavor composition comprises other steviol glycosides, including known and unnamed steviol glycosides, found in the extract of *stevia* leaves.

BRIEF DESCRIPTION OF THE DRAWINGS

Figure 1:
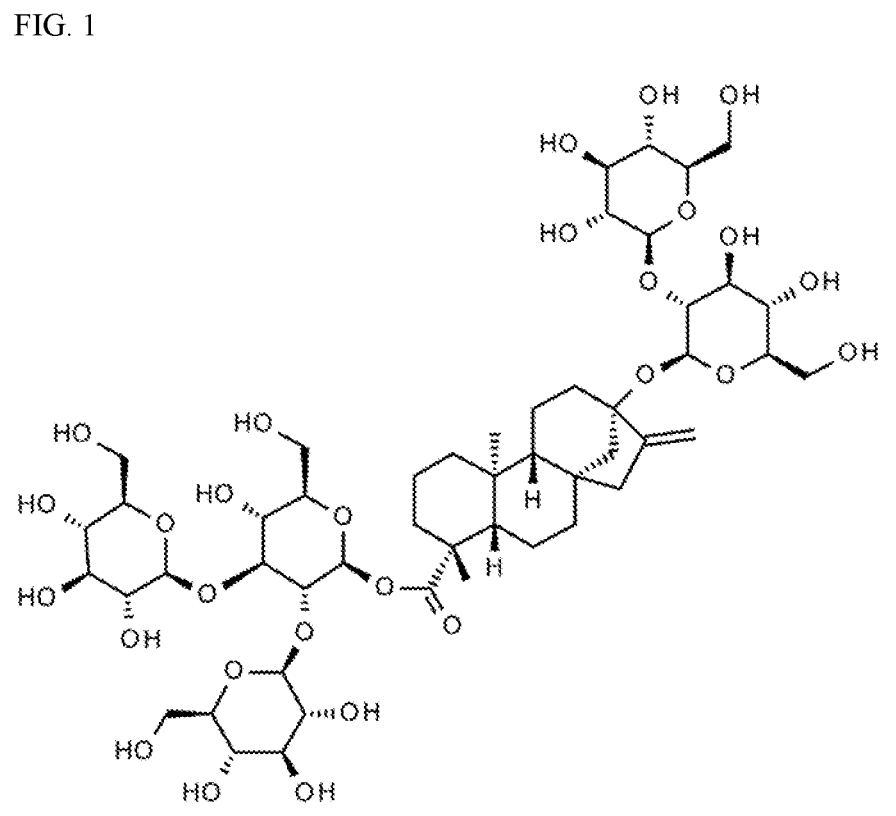

FIG. 1 shows the chemical structure of rebaudioside AM.

FIG. 4, at the end of this document, shows the biocatalytic production of rebausioside AM from rebaudioside E using the enzyme UGT76G1 and concomitant recycling of UDP to UDP-glucose via sucrose synthase SuSy_At.

FIG. 11 is a graph showing the effect of Reb AM on the flavor modification of a Moscow mule.

FIG. 12 is a graph showing the effect of Reb AM on the flavor modification of corn puff cereal.

DETAILED DESCRIPTION

Figure 2:
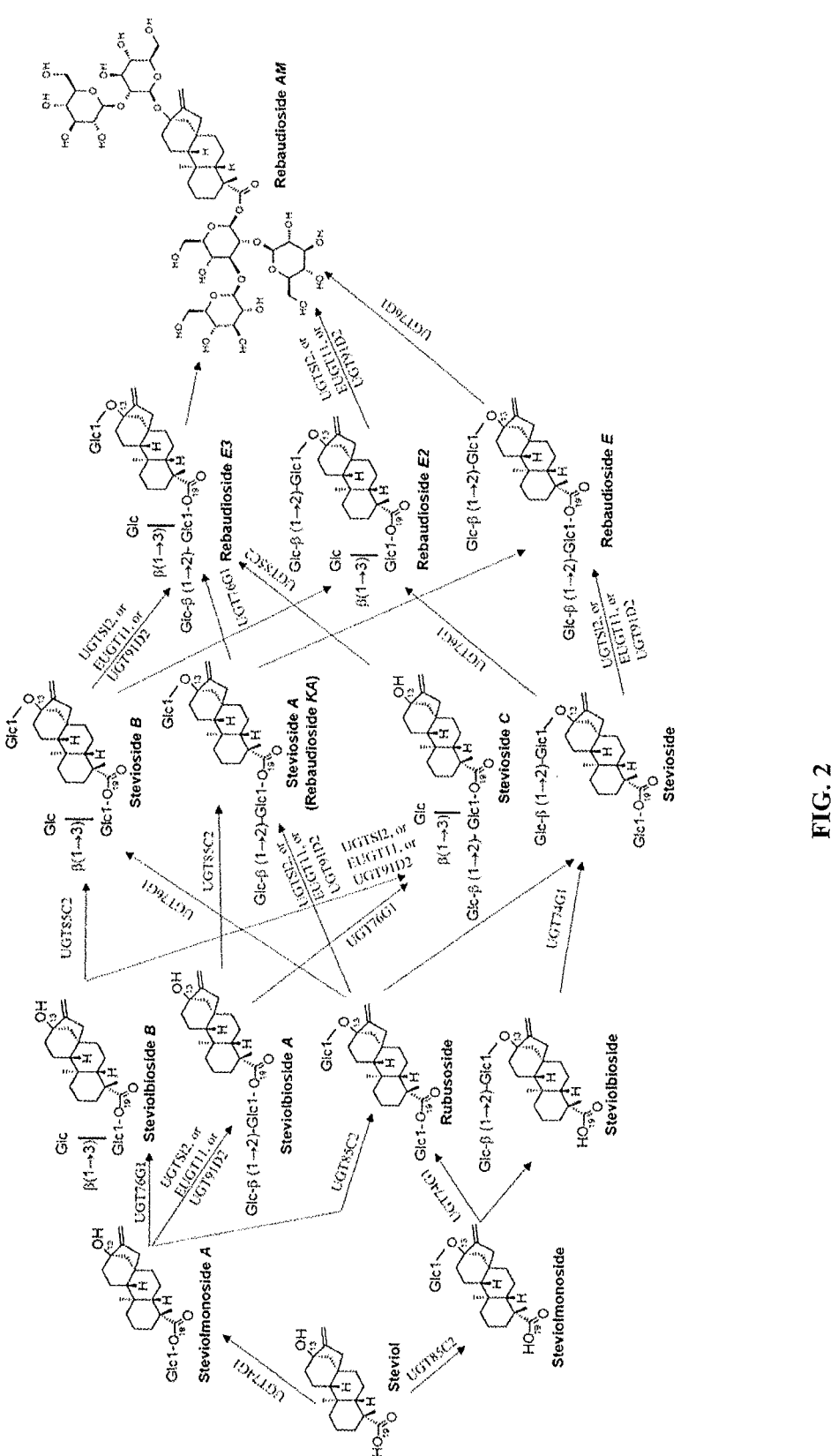
FIG. 2 shows the pathways of producing rebaudioside AM and various steviol glycosides from steviol.

FIG. 2 shows pathways of producing rebaudioside AM and various steviol glycosides from steviol.

Figure 3:
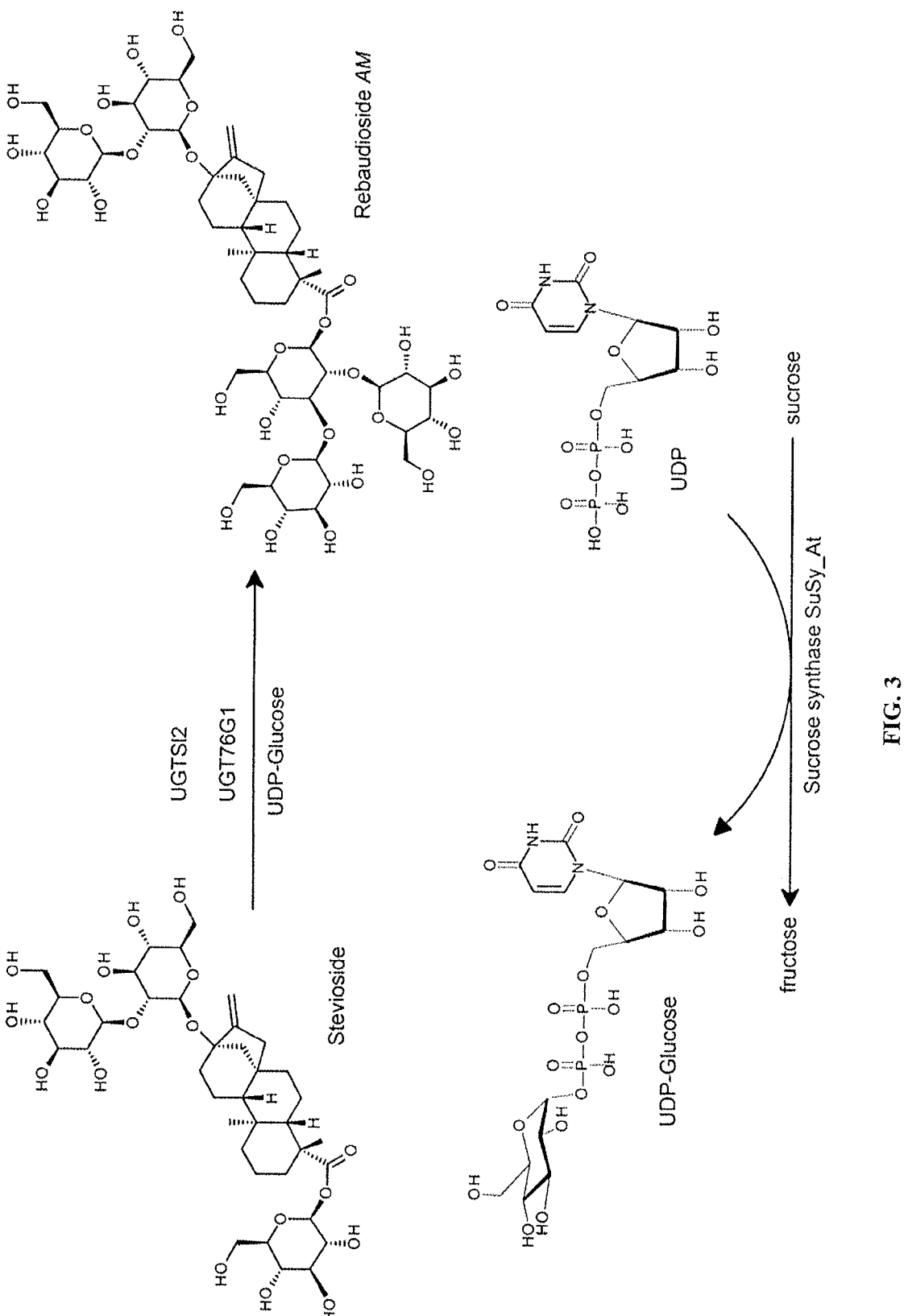
FIG. 3 shows the biocatalytic production of rebaudioside AM from stevioside using the enzymes UGTS12 and UGT76G1 and concomitant recycling of UDP to UDP-glucose via sucrose synthase SuSy_At.
Figure 5:
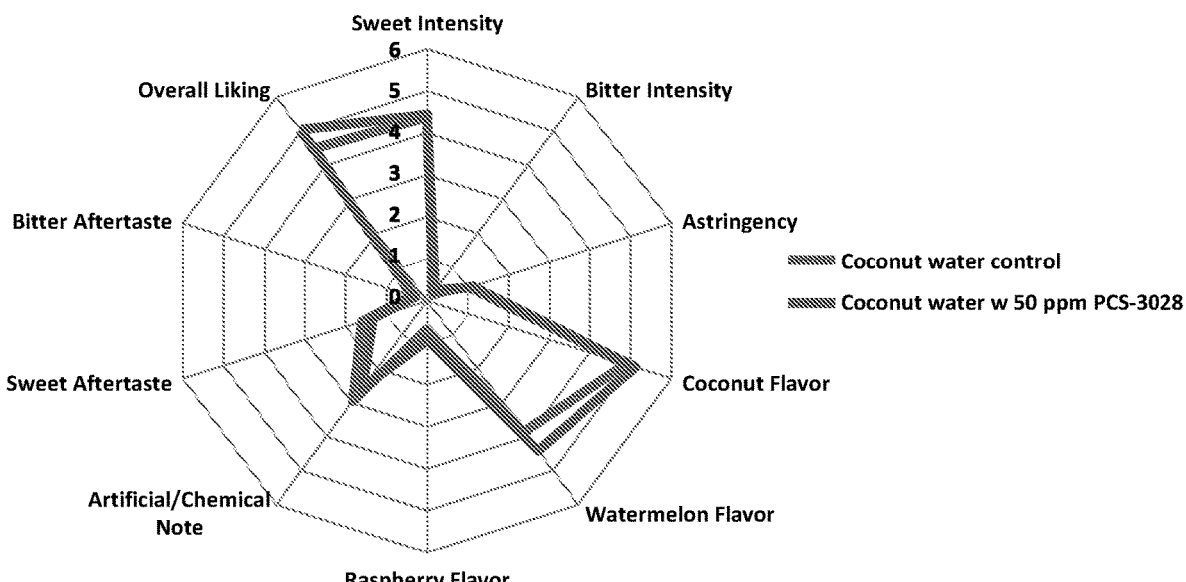
FIG. 5 is a graph showing the effect of Reb AM on the flavor modification of coconut water.
Figure 6:
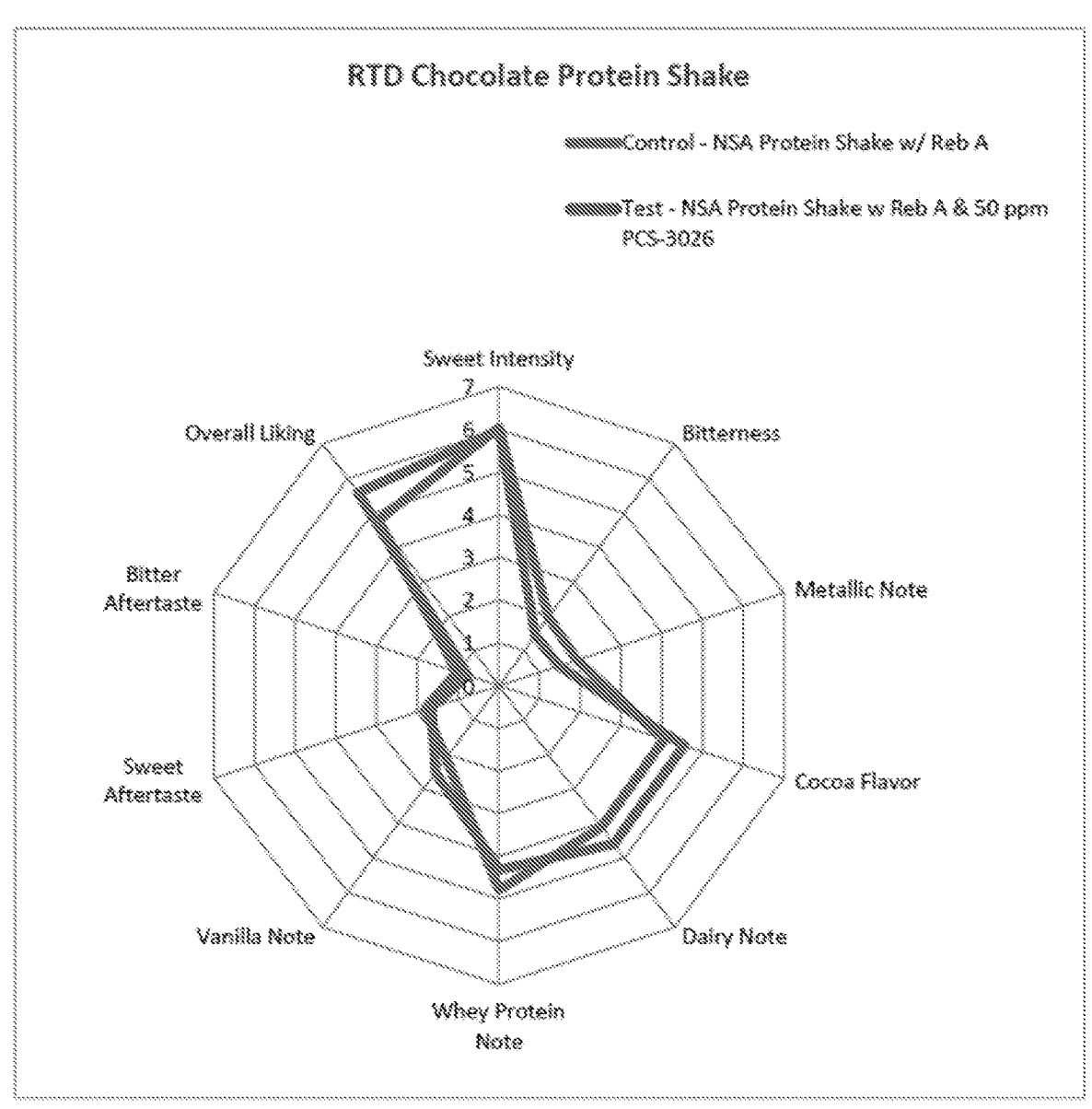
FIG. 6 is a graph showing the effect of Reb AM on the flavor modification of a chocolate protein shake.
Figure 7:
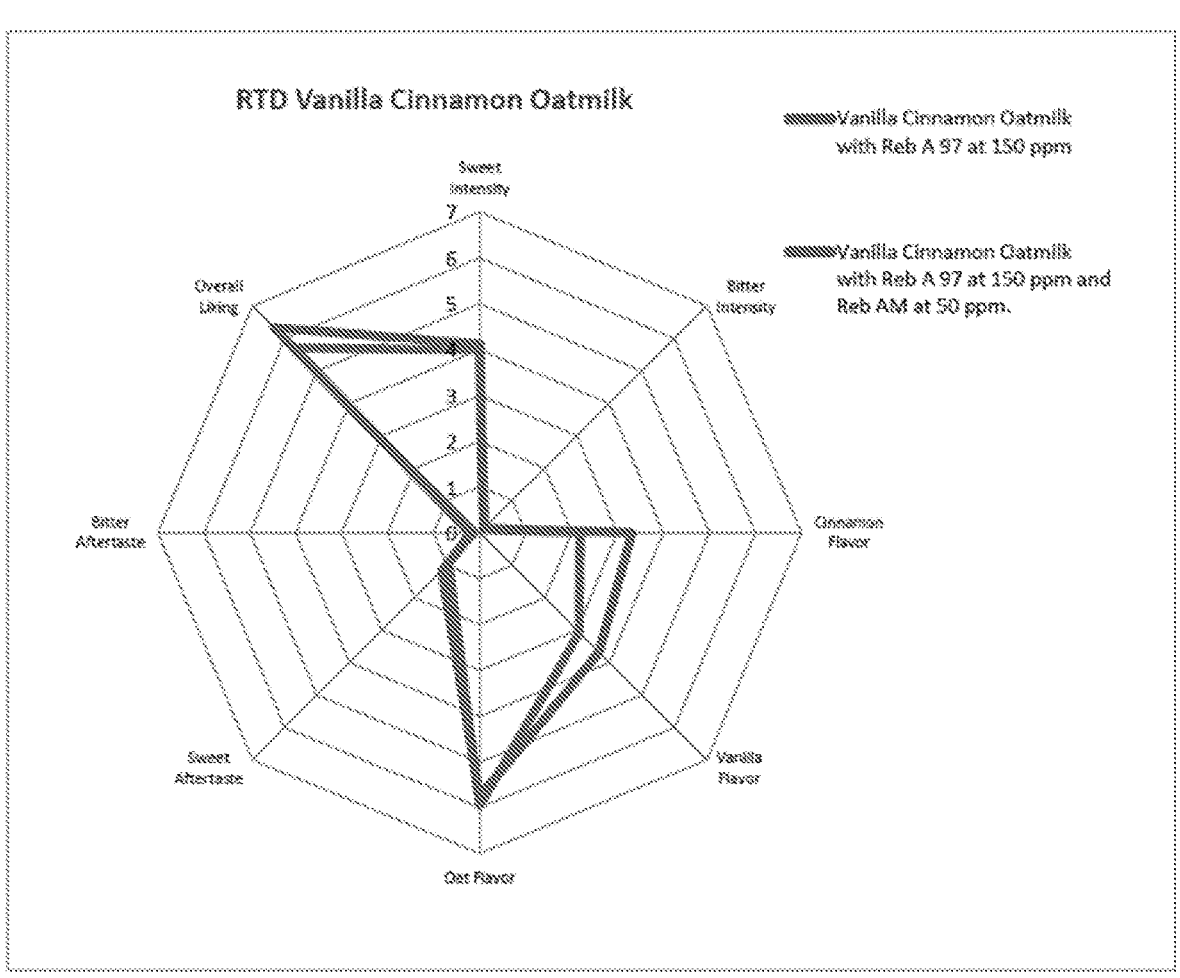
FIG. 7 is a graph showing the effect of Reb AM on the flavor modification of vanilla cinnamon oatmilk.
Figure 8:
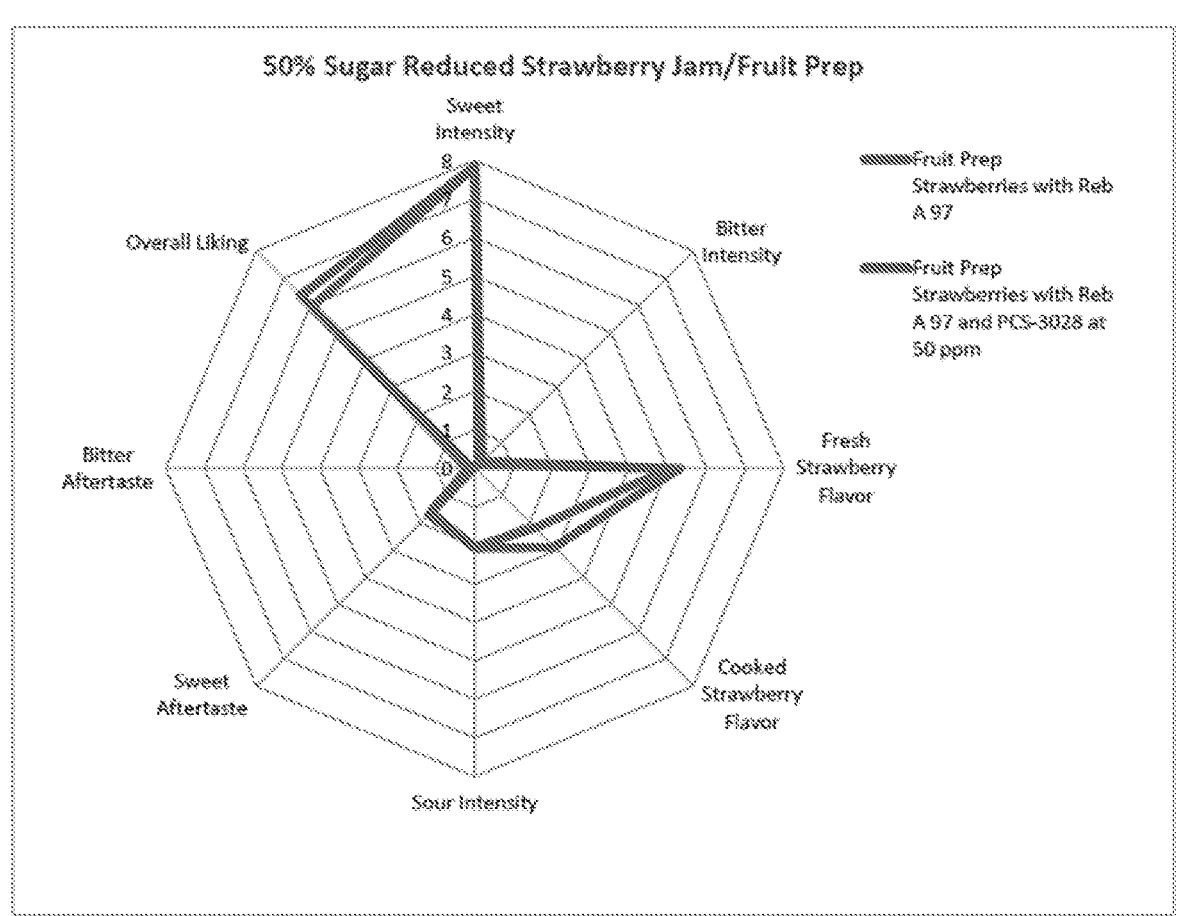
FIG. 8 is a graph showing the effect of Reb AM on the flavor modification of strawberry jam.
Figure 9:
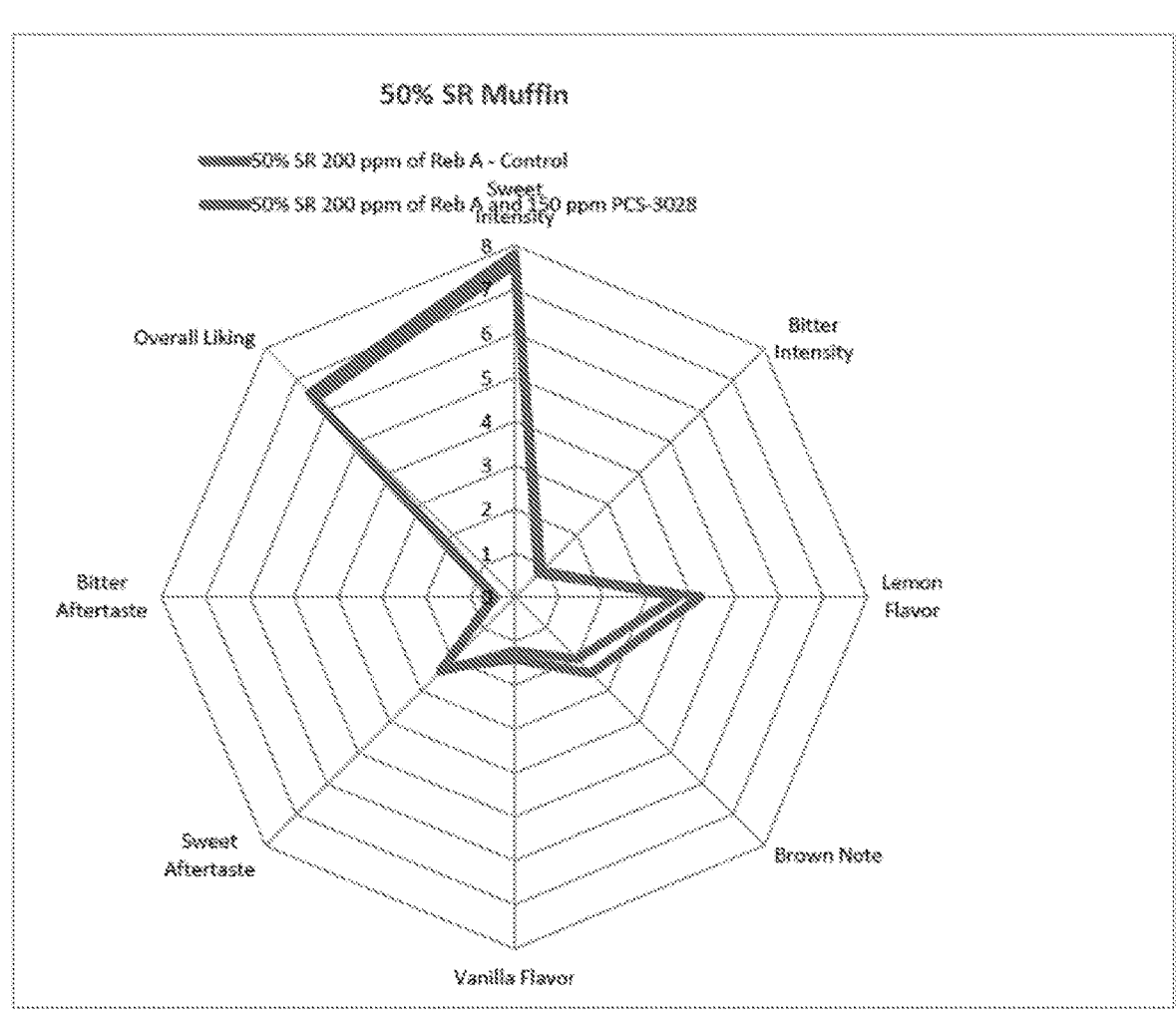
FIG. 9 is a graph showing the effect of Reb AM on the flavor modification of a sugar reduced lemon poppy seed muffin.
Figure 10:
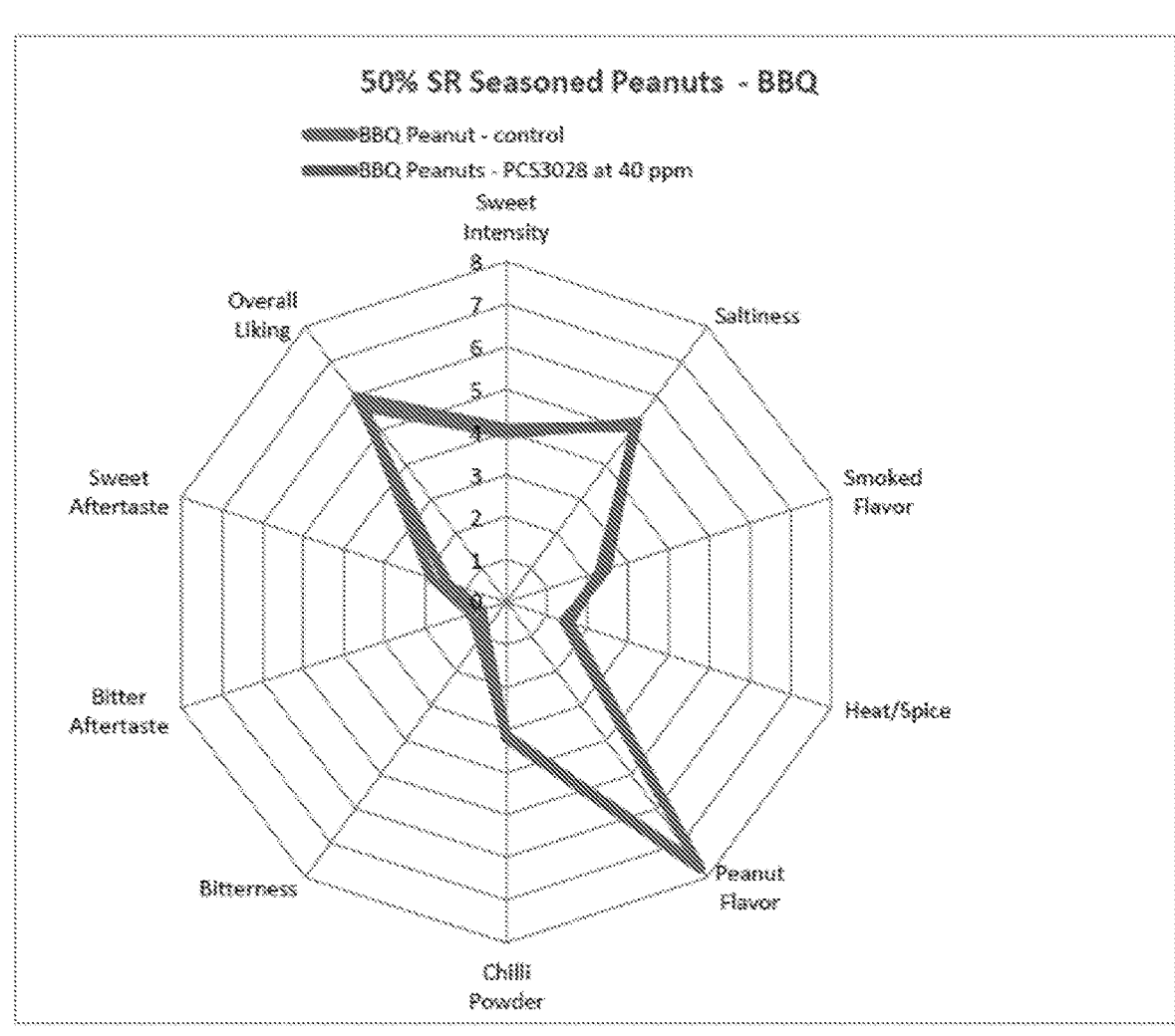
FIG. 10 is a graph showing the effect of Reb AM on the flavor modification of seasoned peanuts.

FIG. 3 shows the biocatalytic production of rebaudioside AM from stevioside using the enzymes UGTS12 and UGT76G1 and concomitant recycling of UDP to UDP-glucose via sucrose synthase SuSy_At.

Figure 4:
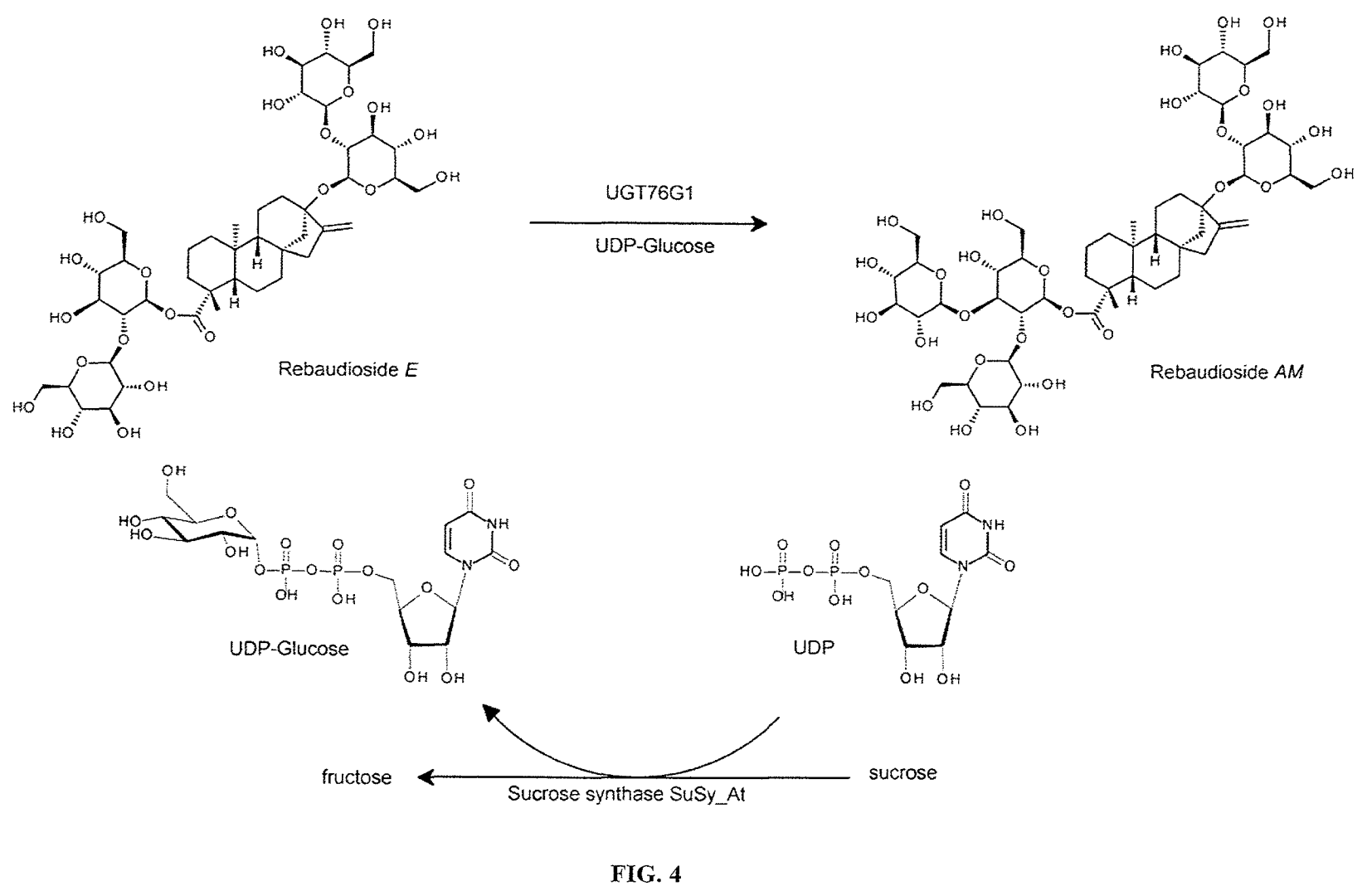

FIG. 4 shows the biocatalytic production of rebausioside AM from rebaudioside E using the enzyme UGT76G1 and concomitant recycling of UDP to UDP-glucose via sucrose synthase SuSy_At.

As used herein, the term "SuSy_AT", unless specified otherwise, refers to sucrose synthase having amino-acid sequence "SEQ ID 1" of the attached Sequence Listing.

As used hereinafter, the term "UGTS12", unless specified otherwise, refers to UDP-glucosyltransferase having amino-acid sequence "SEQ ID 2" of the attached Sequence Listing.

As used hereinafter, the term "UGT76G1", unless specified otherwise, refers to UDP-glucosyltransferase having amino-acid sequence "SEQ ID 3" of the attached Sequence Listing.

One bioconversion process for making the *stevia* flavor composition, identified as "PCS-3028", is described as follows:

Method of Manufacture

| | |
|---|---|
| Botanical Source | *Stevia rebaudiana* (Bertoni) Bertoni dried leaves |
| Yield based on original source material, % | 90% |

Detailed description of the steps involved in the isolation and purification of the natural complex Stage 1

1 part of dried *stevia* leaves soaked in 10 parts of water (50° C., 1 hr) and the mixture is separated from biomass to obtain filtrate with dissolved glycosides. The glycosides are extracted by RO (reverse osmosis) water. No other solvents are used during this stage. The process is carried out in a continuous counter current extractor.

Stage 2

Filtrate with dissolved glycosides is treated with flocculant [$Ca(OH)_2$ 2.5% wt] to precipitate polysaccharides, proteins and pigments. The treatment with flocculant is carried out at ambient temperature during 30 min. Then the mixture is filtered to obtain purified filtrate with dissolved glycosides. The filtration is carried out on a "frame-and-plate" type filter press similar to ones used in sugar production.

Stage 3

Purified filtrate is passed through columns packed with food grade ion exchange resins (Amberlite FPC 23 or equivalent in $H^+$ form, and Amberlite FPA 51 or equivalent in $OH^-$ form). Ion exchange resins are used to remove inorganic salts and organic ions. Cations are removed by Amberlite FPC 23 ($H^+$), and anions by Amberlite FPA 51 ($OH^-$). The deionization step is carried out at ambient temperature. The solution is fed to columns at 0.5 BV/hr. This step provides deionized filtrate.

Stage 4

Deionized filtrate is passed through column packed with macroporous adsorbent resin (Diaion HP20 or equivalent, ambient temperature, 0.5 BV/hr). Macroporous adsorbents are widely used in different food and pharmaceutical applications: separation of valuable compounds from plant extracts, extraction of antibiotic intermediates from fermentation broth, separation of peptides, or food additives, debittering of citrus juice etc. Steviol glycosides which have high affinity to macroporous resin adsorb to it whereas other impurities pass through the column freely. The steviol glycosides adsorbed on the resin are eluted by 70% (vol.) Ethanol to provide aqueous alcohol solution of steviol glycosides. Food grade Ethanol (complies with FCC VIII) is used in this stage. Ethanol is evaporated by a conventional distillation process and the resulting solution is deionized again with food grade ion exchange resins. The refined solution is concentrated and spray dried to yield crude *Stevia* extract.

Stage 5

Crude *Stevia* extract is dissolved in 5 volumes of Ethanol (>90% v/v) and Rebaudioside A (reb A) crystallization is carried out at 20° C. during 24 hrs. The filtrate is separated by centrifugation and the Ethanol from obtained filtrate is evaporated by a conventional distillation process. The filtrate is then spray dried to yield Stevioside 50 powder (containing approx. 50% stevioside and 20% reb A).

Stage 6

Stevioside 50 powder is dissolved in 5 volumes of Methanol (>90% v/v) and stevioside crystallization is carried out at 20° C. during 24 hrs. The filtrate is separated by centrifugation and the Methanol from obtained filtrate is evaporated by a conventional distillation process. Crystals are then dried in a rotary drum vacuum dryer at 110° C. and 10 mbar, sifted through US 80 mesh stainless steel screens and passed through metal detectors to yield Stevioside 75 powder (containing approx. 75% stevioside and 10% reb A).

Stage 7

Food enzymes UDP-glucosyltransferase (UGT; EC 2.4.1.x) and a sucrose-synthase (SuSy; EC 2.4.1.13) are manufactured separately according to the following procedure, based on generally available and accepted methods used for production of microbial enzymes. *E. coli* production strain LE1B109 carrying the expression vector for the corresponding enzyme gene is inoculated in sterilized culture medium and fermented at a pH of between 6-8 and temperature of 25-37° C. until desired enzyme production yield is reached (usually >15 hrs) and the fermentation is stopped. The enzyme is then isolated by first separating the biomass from the culture broth by standard solid/liquid separation techniques (centrifugation and/or filtration). The biomass is homogenized to disrupt the bacterial cells and treated with nuclease to degrade DNA/RNA nucleic acids released upon cell disruption. This is followed by solid/liquid separation to further remove cell debris and other insoluble matter. The cell-free supernatant is filtered to obtain the purified enzyme preparation.

Stage 8

Stevioside 75 powder (containing approx. 75% stevioside) and food-grade sucrose are dissolved in RO water and uridine 5'-diphosphate disodium salt (5'-UDP-Na$_2$; CAS No. 27821-45-0), UGT and SuSy enzymes are added to the solution. The reaction mixture is incubated at 40-50° C. during 10-48 hrs of reaction. The resulting reaction mixture may be heated up to 80-100° C. for 10 minutes to inactivate enzymes.

Stage 9

The reaction mixture is filtered as described in Stage 2. The obtained clear solution is deionized by ion-exchange resins as described in Stage 3. The deionized filtrate is passed through column packed with macroporous adsorbent resin and the steviol glycosides adsorbed on the resin are eluted by aqueous ethanol, as described in Stage 4. Ethanol is evaporated by a conventional distillation process and the resulting solution is concentrated and spray dried to yield crude Rebaudioside AM powder.

| Method of Manufacture |
| --- |
| The obtained powder is sifted through US 80 mesh stainless steel screens and passed through metal detectors to yield PCS-3028 *stevia* extract. Obtained product is a free flowing powder. |
| Solvents Used                 Water, Ethanol, Methanol |
| Reagents Used               $Ca(OH)_2$, sucrose, 5'-UDP-$Na_2$, UGT, SuSy |

Other embodiments of the process are contemplated, including the use of different reagents such as different ion-exchange and adsorption resins, different apparatus including drying apparatus, different screen sizes, and different production strains for the enzymes. One skilled in the art will understand that variations of the reagents, solvents and apparatus will adjust the reaction parameters, and the invention is not limited to this embodiment.

The following Summary and Examples exemplify the use of the high Reb AM *stevia* flavor composition in various consumable applications, and the sweetness detection threshold determination of PCS-3028.

Summary of Sensory Tests Performed with PCS-3028

1. Threshold:
50 ppm of PCS-3028 solution in water provided sweetness perception significantly lower than that of 1.5% sugar solution. Therefore we selected 50 ppm of PCS-3028 as the recognition threshold concentration.
2. Beverage:
a. Raspberry Watermelon Coconut water (PCS-3028 usage level 50 ppm). The results indicated the test sample PCS-3028 had significantly higher watermelon flavor and overall liking compared to the control samples (at 95% confidence).
b. Test sample PCS-3028 had significantly lower sweet aftertaste intensity compared to the control samples (at 90% confidence).
3. Dairy Products:
a. Chocolate Protein Shake with Reb A (PCS-3028 usage level 50 ppm). The panel found the test sample containing 50 ppm of PCS-3028 to be significantly lower bitterness, metallic note, whey protein and lower bitter aftertaste than the control (at 95% confidence).
b. The panel found the test sample containing 50 ppm of PCS-3028 to be significantly higher in cocoa flavor, dairy notes, vanilla flavor, and overall liking (at 95% confidence).
4. Imitation Dairy:
a. Vanilla Cinnamon Oat milk with Reb A (PCS-3028 usage level 50 ppm). The panel found the test sample containing 50 ppm of PCS-3028 to be significantly higher cinnamon flavor, vanilla flavor, and overall liking than the control (at 95% confidence).
b. The panel found the test sample containing 50 ppm of PCS-3028 to be significantly higher in sweet aftertaste (at 90% confidence).
5. Jams & Jellies:
a. Strawberry Fruit Prep with Reb A (PCS-3028 usage level 50 ppm). The panel found the test sample containing 50 ppm of PCS-3028 to be significantly higher cooked strawberry flavor, and overall liking than the control (at 95% confidence and 90% confidence respectively).
b. The panel found the test sample containing 50 ppm of PCS-3028 to be significantly lower in bitter aftertaste (at 90% confidence).

6. Baked Goods:
a. Threshold: 150 ppm of PCS-3028 in Lemon Poppy Seed Muffin provided sweetness perception significantly lower than that of 4.0% sugar solution. Therefore we selected 150 ppm of PCS-3028 as the recognition threshold concentration.
b. Lemon Poppy Seed Muffins (PCS-3028 usage level 150 ppm). The results indicated the test sample PCS-3028 had significantly higher lemon and brown flavor intensity compared to the control samples (at 95% confidence).
7. Snack Foods/Seasoning/Nut Products:
a. Seasoned peanuts with Reb A (PCS-3028 usage level 50 ppm). Test sample had significantly less bitterness and lower aftertaste (sweet and bitter) than the Control sample (at 90% and 95% confidence respectively).
8. Alcoholic Beverages:
a. Moscow Mule (PCS-3028 usage level 50 ppm). The results indicated the test sample PCS-3028 had significantly higher ginger flavor and alcohol intensity compared to the control samples (at 95% confidence).
9. Breakfast Cereal:
a. Threshold: 150 ppm PCS-3028 in corn puff breakfast cereal provided sweetness perception significantly lower that 3.0% sugar solution. Therefore, we selected 150 ppm of PCS-3028 as the recognition threshold concentration.
b. Vanilla corn puffs (PCS-3028 usage level 150 ppm). Test sample had significantly higher vanilla, brown, corn flavor and overall liking than the Control sample (95% confidence). Additionally the test sample showed higher sweet aftertaste at 90% confidence.

Example 1

Sweetness Perception

Threshold with PCS-3028

Application: Neutral Water
Test #1
The sweetness perception of 1.5% sugar solution and different solutions of PCS-3028 were tested with a consumer panel and found that 50 ppm of PCS-3028 solution in water provided sweetness perception significantly lower than that of 1.5% sugar solution. Therefore we selected 50 ppm of PCS-3028 as the recognition threshold concentration.

| METHODOLOGY | |
| --- | --- |
| Nature of Participants: | Company employees |
| Number of Sessions | 1 |
| Number of Participants: | 30 |
| Test Design: | 2- AFC, Balanced, randomized within pair. Blind |
| Sensory Test Method: | Intensity ratings |
| Environmental Condition | Standard booth lighting |
| Attributes and Scales: | Which sample is sweeter? |
| Statistical Analysis: | Paired comparison Test |
| Sample Size | ~1.5 oz. in a clear capped plastic cup |

7

-continued

| METHODOLOGY | |
| --- | --- |
| Serving Temperature | Room temperature (~70° F.) |
| Serving/Panelists | Samples served simultaneously. Panelists |
| Instruction: | instructed to read ingredient statement, |
| | evaluate each sample. |

This is a re-evaluation of the recognition threshold concentration to follow methodology outlined in section 1.4.2 of the "Guidance for the Sensory Testing of Flavorings with Modifying Properties within the FEMA GRAS™ Program".

| DATA: n = 30 | | | | | |
| --- | --- | --- | --- | --- | --- |
| Two-Tailed Analysis Table Report for Result PCS-3028 | | | | | |
| | 1.5% | 30 ppm PCS- | Percent Frequency | Binomial Distribution Probability | |
| | Sucrose | 3028 | Sample 1 | P-value | Sig |
| PC | 29 | 1 | 96.7% | 0.0001 | *** |
| % Frequency | 96.7% | 3.3% | | | |

| DATA: n = 30 | | | | | |
| --- | --- | --- | --- | --- | --- |
| Two-Tailed Analysis Table Report for Result PCS-3028 | | | | | |
| | 1.5% | 50 ppm PCS- | Percent Frequency | Binomial Distribution Probability | |
| | Sucrose | 3028 | Sample 1 | P-value | Sig |
| PC | 21 | 9 | 70.0 | 0.04 | *** |
| % Frequency | | | | | |

| DATA: n = 30 | | | | | |
| --- | --- | --- | --- | --- | --- |
| Two-Tailed Analysis Table Report for Result ISO3026A | | | | | |
| | 1.5% | 70 ppm of PCS- | Percent Frequency | Binomial Distribution Probability | |
| | Sucrose | 3028 | Sample 1 | P-value | Sig |
| PC | 3 | 27 | 10.0% | 0.000 | *** |
| % Frequency | 10% | 90% | | | |

Example 2

Raspberry Watermelon Coconut Water with PCS-3028

Application: Non-Alcoholic Beverage

SUMMARY

Thirty company employees evaluated two samples of raspberry watermelon flavored coconut water for overall acceptance and attribute intensities (sweetness, Raspberry flavor, watermelon flavor, coconut water flavor, saltiness, bitterness, and sweet aftertaste, bitter aftertaste) in two sessions. In session one, the two samples included: 1) store-bought Raspberry Watermelon Coconut Water control sample and 2) store-bought Raspberry Watermelon Coconut Water test sample containing PCS-3028. The objective of the test was to determine if the addition of PCS-3028 affects the flavor profile of a non-alcoholic beverage. The results indicated the test sample PCS-3028 had significantly higher mango peach flavor, coconut water flavor, and overall liking compared to the control samples (at 95% confidence).

Project Objective

The project objective is to assess if the addition of *stevia* extract solids has an effect on key flavor attributes in various beverage applications.

Test Objective

The test objective is to determine if the flavor profile and overall acceptance of a Control sample of flavored coconut water differs from a Test sample of the same beverage containing PCS-3028.

| METHODOLOGY | |
| --- | --- |
| Nature of Participants: | Company employees |
| Number of Sessions | 1 |
| Number of Participants: | 30 |
| Test Design: | Balanced, randomized within pair. Blind |
| Sensory Test Method: | Intensity and acceptance ratings |
| Environmental Condition | Standard booth lighting |
| Attributes and Scales: | |
| Overall Acceptance on a 10-pt hedonic scale where 10 = Extremely | |
| Like and 0 = Extremely Dislike | |
| Overall liking, sweetness, raspberry flavor, watermelon flavor, coconut | |
| water flavor, astringency, artificial chemical note, bitterness, and | |
| sweet aftertaste, bitter aftertaste. 10-pt continuous intensity scale | |
| where 0 = Imperceptible and 10 = Extremely Pronounced | |
| Statistical Analysis: | ANOVA (by Block) with Post Hoc Duncan's Test |
| Sample Size | ~1.5 oz. in a clear capped plastic cup |
| Serving Temperature | Refrigerated temperature (~45° F.) |
| Serving/Panelists | Samples served simultaneously. Panelists |
| Instruction: | instructed to read ingredient statement, |
| | evaluate each sample. |

Samples

| Beverage Type I, Non-alcoholic | | |
| --- | --- | --- |
| | Reference | PCS-3028 |
| *Coconut water raspberry watermelon juice PCS-3028 | 100 | 99.995 0.005 |
| Total (g) | 100 | 100 |

*Vita Coco store brand

Results

Table 1 (below) summarizes the overall acceptance and mean attribute intensity results for each sample.

TABLE 1

Mean Scores Raspberry Watermelon
Coconut Water with 50 ppm PCS-3028
Summary of Mean-Scores, P-Values, and Significance
Test Result Code: Coconut Water (raspberry/
watermelon flavor) PCS-3028 at 50 ppm
This test was performed on 30 panelists.

| Attribute | Coconut water control | Coconut water with 50 ppm of PCS-3028 | P-Value | Sig |
|---|---|---|---|---|
| Sweet Intensity | 4.38 | 4.44 | 0.6990 | NS |
| Bitter Intensity | 0.32 | 0.24 | 0.4267 | NS |
| Astringency | 1.04 | 1.10 | 0.4942 | NS |
| Coconut Flavor | 4.89 | 5.11 | 0.4372 | NS |
| Watermelon Flavor | b 3.85 | a 4.41 | 0.0221 | *** |
| Raspberry Flavor | 0.68 | 0.95 | 0.2423 | NS |
| Artificial/Chemical Note | 2.94 | 2.55 | 0.2583 | NS |
| Sweet Aftertaste | a 1.60 | b 1.33 | 0.0905 | ** |
| Bitter Aftertaste | 0.36 | 0.29 | 0.5409 | NS |
| Overall Liking | b 4.49 | a 5.04 | 0.0710 | ** |

*= 80% CI,
** = 90% CI,
*** = 95% CI

The results indicated the test sample PCS-3028 had significantly higher watermelon flavor and overall liking compared to the control samples (at 95% confidence).

Test sample PCS-3028 had significantly lower sweet aftertaste intensity compared to the control samples (at 90% confidence).

Example 2 Conclusion

Thirty company employees evaluated two samples of Raspberry Watermelon flavored coconut water for overall acceptance and attribute intensities (sweetness, watermelon flavor, raspberry flavor, coconut water flavor, astringency, artificial/chemical note, bitterness, and sweet aftertaste, bitter aftertaste) in two sessions. In session one, the two samples included: 1) store-bought Raspberry Watermelon Coconut Water control sample and 2) store-bought Raspberry Watermelon Coconut Water test sample containing PCS-3028. The objective of the test was to determine if the addition of PCS-3028 affects the flavor profile of a non-alcoholic beverage. The results indicated the test sample PCS-3028 had significantly higher watermelon flavor and overall liking compared to the control samples (at 95% confidence).

Test sample PCS-3028 had significantly lower sweet aftertaste intensity compared to the control samples (at 90% confidence).

Example 3

Chocolate Protein Shake with PCS-3028
Application: Milk/Dairy Product

SUMMARY

Thirty company employees evaluated two samples of chocolate flavored dairy protein shake for overall acceptance and attribute intensities (cocoa flavor, dairy note, whey protein, vanilla, metallic, sweetness, bitterness and aftertaste). The two samples included: 1) no sugar added "Control" sample containing 300 ppm PureCircle Reb A and 2) no sugar added "Test" sample containing 300 ppm PureCircle Reb A and 50 ppm PCS-3028. The objective of the test was to determine if the addition of PCS-3028 affects the flavor profile of a milk product. The panel found the test sample containing 50 ppm of PCS-3028 to be significantly lower bitterness, metallic note, whey protein and lower bitter aftertaste than the control (at 95% confidence) and higher in cocoa flavor, dairy notes, vanilla flavor, and overall liking (at 95% confidence). Further, there was no significant impact on sweetness intensity.

Project Objective

The project objective is to assess if the addition of *stevia* extract solids has an effect on key flavor attributes in various beverage applications.

Test Objective

The test objective is to determine if the flavor profile and overall acceptance of a control sample of dairy beverage application differs from a Test sample of the same beverage containing PCS-3028.

METHODOLOGY

| | |
|---|---|
| Nature of Participants: | Company employees |
| Number of Sessions | 1 |
| Number of Participants: | 30 |
| Test Design: | Balanced, randomized within pair. Blind |
| Sensory Test Method: | Intensity and acceptance ratings |
| Environmental Condition | Standard booth lighting |
| Attributes and Scales: | |
| Overall Acceptance on a 10-pt hedonic scale where 10 = Extremely Like and 0 = Extremely Dislike | |
| Overall liking, sweetness, bitterness, cocoa flavor, dairy notes, chocolate, whey protein notes, metallic note, vanilla note, and Aftertaste. 10-pt continuous intensity scale where 0 = Imperceptible and 10 = Extremely Pronounced | |
| Statistical Analysis: | ANOVA (by Block) with Post Hoc Duncan's Test |
| Sample Size | ~1.5 oz. in a clear capped plastic cup |
| Serving Temperature | Refrigerated temperature (~45° F.) |
| Serving/Panelists | Samples served simultaneously. Panelists |
| Instruction: | instructed to read ingredient statement, evaluate each sample. |

SAMPLES

| Ingredient list | Sugar Reference | 50 ppm PCS-3028 |
|---|---|---|
| Milk, 2% | 86.47 | 86.465 |
| Whey Protein 90 Instant - Non GMO (Prod: 18618) | 6.8250 | 6.8250 |
| Non-Fat Dry Milk | 4.6269 | 4.6269 |
| Maltrin QD M585 | 1.1066 | 1.1066 |
| Vitamin Blend - | 0.0063 | 0.0063 |
| Xanthan Gum (Cold dissolve) | 0.0359 | 0.0359 |
| Forbes 10/12 Cocoa powder 7113 | 0.7194 | 0.7194 |
| Vanilla Flavor Powder | 0.1799 | 0.1799 |
| Reb A | 0.0300 | 0.0300 |
| PCS-3028 | | 0.0050 |
| TOTAL | 100 | 100 |

| Sugar Contribution (grams) per 100 grams* | Sugar Reference | 165 ppm PCS-3028 |
|---|---|---|
| Milk, 2% | 4.08 | 4.15 |
| Non-Fat Dry Milk | 2.41 | 2.41 |
| Maltrin QD M585 | 0.08 | 0.08 |
| TOTAL | 8.07 | 6.64 |

*Calculated with Genesis R&D version 11.4

Table 2 (below) summarizes the results.

TABLE 2

Effect of PCS PCS-3028 on flavor
modification of Chocolate Protein shake
Summary of Mean-Scores, P-Values, and Significance
Test Result Code: PROTEIN6
Test Description: Chocolate Vanilla
Protein Dairy Shake: 500 ppm Reb AM
This test was performed on 30 panelists.

| Attribute | Control - NSA Protein Shake w/Reb A | Test - NSA Protein Shake w Reb A & 50 ppm PCS-3028 | P-Value | Sig |
|---|---|---|---|---|
| Sweet Intensity | 6.04 | 5.98 | 0.7329 | NS |
| Bitterness | a | b | 0.0138 | *** |
| | 1.98 | 1.46 | | |
| Metallic Note | a | b | 0.0311 | *** |
| | 1.93 | 1.48 | | |
| Cocoa Flavor | b | a | 0.0409 | *** |
| | 4.06 | 4.55 | | |
| Dairy Note | b | a | 0.0515 | ** |
| | 4.10 | 4.59 | | |
| Whey Protein Note | a | b | 0.0460 | *** |
| | 4.79 | 4.32 | | |
| Vanilla Note | b | a | 0.0174 | *** |
| | 2.10 | 2.52 | | |
| Sweet Aftertaste | 1.82 | 1.65 | 0.2130 | NS |
| Bitter Aftertaste | a | b | 0.0495 | *** |
| | 1.03 | 0.77 | | |
| Overall Liking | b | a | 0.0001 | *** |
| | 4.80 | 5.59 | | |

* = 80% CI,
** = 90% CI,
*** = 95% CI

The panel found the test sample containing 50 ppm of PCS-3028 to be significantly lower bitterness, metallic note, whey protein and lower bitter aftertaste than the control (at 95% confidence).

The panel found the test sample containing 50 ppm of PCS-3028 to be significantly higher in cocoa flavor, dairy notes, vanilla flavor, and overall liking (at 95% confidence).

Example 3 Conclusion

Thirty company employees evaluated two samples of chocolate flavored dairy protein shake for overall acceptance and attribute intensities (cocoa flavor, dairy note, whey protein, vanilla, metallic, sweetness, bitterness and aftertaste). The two samples included: 1) no sugar added "Control" sample containing 300 ppm PureCircle Reb A and 2) no sugar added "Test" sample containing 300 ppm PureCircle Reb A and 50 ppm PCS-3028. The objective of the test was to determine if the addition of PCS-3028 affects the flavor profile of a milk product. The panel found the test sample containing 50 ppm of PCS-3028 to be significantly lower bitterness, metallic note, whey protein and lower bitter aftertaste than the control (at 95% confidence) and higher in cocoa flavor, dairy notes, vanilla flavor, and overall liking (at 95% confidence). Further, there was no significant impact on sweetness intensity.

Example 4

Cinnamon Vanilla Oatmilk with PCS-3028
Application: Non-Dairy/Imitation Dairy Product

SUMMARY

Thirty company employees evaluated two samples of cinnamon vanilla oatmilk for overall acceptance and attribute intensities (cinnamon, vanilla, oat, sweetness, bitterness and aftertaste). The two samples included: 1) no sugar added "Control" sample containing 150 ppm PureCircle Reb A and 2) no sugar added "Test" sample containing 150 ppm PureCircle Reb A and 50 ppm PCS-3028. The objective of the test was to determine if the addition of PCS-3028 affects the flavor profile of imitation dairy. The panel found the test sample containing 50 ppm of PCS-3028 to have significantly higher cinnamon, vanilla flavor and overall liking than the control (at 95% confidence). Further, there was no significant impact on sweetness intensity.

Project Objective

The project objective is to assess if the addition of *stevia* extract solids has an effect on key flavor attributes in various beverage applications.

Test Objective

The test objective is to determine if the flavor profile and overall acceptance of a control sample of imitation dairy beverage application differs from a Test sample of the same beverage containing PCS-3028.

METHODOLOGY

| | |
|---|---|
| Nature of Participants: | Company employees |
| Number of Sessions | 1 |
| Number of Participants: | 30 |
| Test Design: | Balanced, randomized within pair. Blind |
| Sensory Test Method: | Intensity and acceptance ratings |
| Environmental Condition | Standard booth lighting |
| Attributes and Scales: | |
| Overall Acceptance on a 10-pt hedonic scale where | |
| 10 = Extremely Like and 0 = Extremely Dislike | |
| Overall Liking, sweetness, bitterness, vanilla, cinnamon, oat, and | |
| aftertaste. 10-pt continuous intensity scale where 0 = Imperceptible | |
| and 10 = Extremely Pronounced | |
| Statistical Analysis: | ANOVA (by Block) with Post Hoc Duncan's Test |
| Sample Size | ~1.5 oz. in a clear capped plastic cup |
| Serving Temperature | Refrigerated temperature (~45° F.) |
| Serving/Panelists Instruction: | Samples served simultaneously. Panelists instructed to read ingredient statement, evaluate each sample. |

SAMPLES

| | NSA Reb A | Reb A + PCS3028 |
|---|---|---|
| Oatmilk Unsweetened plain | 99.735 | 99.48 |
| Vanilla flavor | 0.15 | 0.3 |
| Cinnamon flavor | 0.1 | 0.2 |
| Reb A 97 | 0.015 | 0.015 |
| PCS-3028 | | 0.005 |
| Total g | 100 | 100 |

Results

Table 3 (below) summarizes the results.

TABLE 3

Effect of PCS-3028 on flavor modification of Vanilla Cinnamon Oatmilk
Summary of Mean-Scores, P-Values, and Significance
Test Description: Quaker Oatmilk with Vanilla and Cinnamon
Flavor and Reb A 97 at 150 ppm with PCS3028 at 50 ppm
This test was performed on 30 panelists.

| Attribute | Vanilla Cinnamon Oatmilk with Reb A 97 at 150 ppm | Vanilla Cinnamon Oatmilk with reb A 97 at 150 ppm and PCS-3028 at 50 ppm | P-Value | Sig |
|---|---|---|---|---|
| Sweet Intensity | 3.99 | 4.12 | 0.2662 | NS |
| Bitter Intensity | 0.11 | 0.14 | 0.6024 | NS |
| Cinnamon Flavor | b 2.19 | a 3.32 | 0.0001 | *** |
| Vanilla Flavor | b 3.07 | a 3.68 | 0.0038 | *** |
| Oat Flavor | 5.96 | 5.75 | 0.2865 | NS |
| Sweet Aftertaste | b 0.95 | a 1.17 | 0.0940 | ** |
| Bitter Aftertaste | 0.21 | 0.15 | 0.5725 | NS |
| Overall Liking | b 5.72 | a 6.34 | 0.0282 | *** |

*= 80% CI,
** = 90% CI,
*** = 95% CI

The panel found the test sample containing 50 ppm of PCS-3028 to be significantly higher cinnamon flavor, vanilla flavor, and overall liking than the control (at 95% confidence).

The panel found the test sample containing 50 ppm of PCS-3028 to be significantly higher in sweet aftertaste (at 90% confidence).

Example 4 Conclusion

Thirty company employees evaluated two samples of cinnamon vanilla oatmilk for overall acceptance and attribute intensities (cinnamon, vanilla, oat, sweetness, bitterness and aftertaste). The two samples included: 1) no sugar added "Control" sample containing 150 ppm PureCircle Reb A and 2) no sugar added "Test" sample containing 150 ppm PureCircle Reb A and 50 ppm PCS-3028. The objective of the test was to determine if the addition of PCS-3028 affects the flavor profile of imitation dairy. The panel found the test sample containing 50 ppm of PCS-3028 to have significantly higher cinnamon, vanilla flavor and overall liking than the control (at 95% confidence). Further, there was no significant impact on sweetness intensity.

Example 5

Strawberry Jam/Fruit Prep with PCS-3028
Application: Jams and Jellies

SUMMARY

Thirty company employees evaluated two samples of strawberry jam/fruit prep for overall acceptance and attribute intensities (strawberry, sour, sweetness, bitterness and aftertaste). The two samples included: 1) no sugar added "Control" sample containing 400 ppm PureCircle Reb A and 2) no sugar added "Test" sample containing 400 ppm PureCircle Reb A and 50 ppm PCS-3028. The objective of the test was to determine if the addition of PCS-3028 affects the flavor profile of strawberry jam/fruit prep. The panel found the test sample containing 50 ppm of PCS-3028 to have significantly higher cooked strawberry flavor and overall liking than the control (at 95% confidence and 90% confidence respectively). Additionally, the product had significantly lower bitter aftertaste than the control (at 90% confidence). Further, there was no significant impact on sweetness intensity.

Project Objective

The project objective is to assess if the addition of *stevia* extract solids has an effect on key flavor attributes in various beverage applications.

Test Objective

The test objective is to determine if the flavor profile and overall acceptance of a control sample of jam and jelly application differs from a Test sample of the same beverage containing PCS-3028.

METHODOLOGY

| | |
|---|---|
| Nature of Participants: | Company employees |
| Number of Sessions | 1 |
| Number of Participants: | 30 |
| Test Design: | Balanced, randomized within pair. Blind |
| Sensory Test Method: | Intensity and acceptance ratings |
| Environmental Condition | Standard booth lighting |
| Attributes and Scales: | |
| Overall Acceptance on a 10-pt hedonic scale where 10 = Extremely Like and 0 = Extremely Dislike | |
| Overall Liking, sweetness, bitterness, strawberry, sour and aftertaste. 10-pt continuous intensity scale where 0 = Imperceptible and 10 = Extremely Pronounced | |
| Statistical Analysis: | ANOVA (by Block) with Post Hoc Duncan's Test |
| Sample Size | ~1.5 oz. in a clear capped plastic cup |
| Serving Temperature | Refrigerated temperature (~45° F.) |
| Serving/Panelists | Samples served simultaneously. Panelists |
| Instruction: | instructed to read ingredient statement, evaluate each sample. |

SAMPLES

50% Sugar Reduced Strawberry Fruit Prep

| Ingredients | 50% SR Reb A | 50% SR Reb A + PCS3028 |
|---|---|---|
| Water | 41.7571 | 41.7571 |
| Sodium Citrate | 0.0453 | 0.0453 |
| Potassium Sorbate | 0.0453 | 0.0453 |
| Sucrose | 9.0634 | 0.0634 |
| Starch | 3.5 | 3.5 |
| Reb A | 0.04 | 0.04 |
| Pureed Frozen Strawberries | 45.317 | 45.3172 |
| Red Food Coloring | 0.2719 | 0.2719 |
| PCS-3028 | | 0.005 |
| Total: | 100 | 100 |

Table 4 (below) summarizes the results.

TABLE 4

Effect of PCS-3028 on flavor modification of Strawberry Fruit Prep/Jam
Summary of Mean-Scores, P-Values, and Significance
Test Description: Fruit Prep Strawberries
Reb A 97 at 400 ppm with PCS-3028 as 50 ppm
This test was performed on 30 panelists.

| Attribute | Fruit Prep Strawberries with Reb A 97 | Fruit Prep Strawberries with Reb A 97 and PCS3028 at 50 ppm | P-Value | Sig |
|---|---|---|---|---|
| Sweet Intensity | 7.83 | 7.85 | 0.9318 | NS |
| Bitter intensity | a | b | 0.1771 | * |
| | 0.27 | 0.13 | | |
| Fresh Strawberry Flavor | 5.08 | 5.30 | 0.4223 | NS |
| Cooked Strawberry Flavor | b | a | 0.0166 | *** |
| | 2.18 | 2.89 | | |
| Sour Intensity | 2.03 | 2.06 | 0.7956 | NS |
| Sweet Aftertaste | 1.70 | 1.60 | 0.5091 | NS |
| Bitter Aftertaste | a | b | 0.0786 | ** |
| | 0.19 | 0.05 | | |
| Overall Liking | b | a | 0.0870 | ** |
| | 5.96 | 6.37 | | |

\* = 80% CI,
\*\* = 90% CI,
\*\*\* = 95% CI

The panel found the test sample containing 50 ppm of PCS-3028 to be significantly higher cooked strawberry flavor, and overall liking than the control (at 95% confidence and 90% confidence respectively).

The panel found the test sample containing 50 ppm of PCS-3028 to be significantly lower in bitter aftertaste (at 90% confidence).

Example 5 Conclusion

Thirty company employees evaluated two samples of strawberry jam/fruit prep for overall acceptance and attribute intensities (strawberry, sour, sweetness, bitterness and aftertaste). The two samples included: 1) no sugar added "Control" sample containing 400 ppm PureCircle Reb A and 2) no sugar added "Test" sample containing 400 ppm PureCircle Reb A and 50 ppm PCS-3028. The objective of the test was to determine if the addition of PCS-3028 affects the flavor profile of strawberry jam/fruit prep. The panel found the test sample containing 50 ppm of PCS-3028 to have significantly higher cooked strawberry flavor and overall liking than the control (at 95% confidence and 90% confidence respectively). Additionally, the product had significantly lower bitter aftertaste than the control (at 90% confidence). Further, there was no significant impact on sweetness intensity.

Example 6a

Sweetness Perception Threshold with PCS-3028
Application: Baked Goods

SUMMARY

The sweetness perception of 4.0% sugar solution and different solutions of PCS3028 were tested with a consumer panel and found that 150 ppm of PCS3028 in Lemon Poppy Seed Muffin provided sweetness perception significantly less than that of 4.0% sugar solution in a Lemon Poppy Seed Muffin. Additional threshold test data found for Lemon Poppy Seed Muffin provided in Appendix.

| METHODOLOGY | |
|---|---|
| Nature of Participants: | Company employees |
| Number of Sessions | 1 |
| Number of Participants: | ≥30 |
| Test Design: | 2- AFC, Balanced, randomized within pair. Blind |
| Sensory Test Method: | Intensity ratings |
| Environmental Condition | Standard booth lighting |
| Attributes and Scales: | Which sample is sweeter? |
| Statistical Analysis: | Paired comparison Test |
| Sample Size | ~2.0 oz. in a clear plastic cup |
| Serving Temperature | Room temperature (~70° F.) |
| Serving/Panelists | Samples served simultaneously. Panelists |
| Instruction: | instructed to read ingredient statement, evaluate each sample. |

DATA: n = 30

Two-Tailed Analysis
Table Report for Result

| | 4% sugar in muffins | 70 ppm PCS3028 in muffins | Percent Frequency | Binomial Distribution Probability | |
|---|---|---|---|---|---|
| | Sample 1 | Sample 2 | Sample 1 | P-value | Sig |
| PC Frequency | 23 76.7% | 7 23.3% | 76.7% | 0.0052 | *** |

DATA: n = 30

Two-Tailed Analysis
Table Report for Result

| | 4% sugar in muffins | 150 ppm PCS3028 in muffins | Percent Frequency | Binomial Distribution Probability | |
|---|---|---|---|---|---|
| | Sample 1 | Sample 2 | Sample 1 | P-value | Sig |
| PC Frequency | 21 70% | 9 30% | 70% | 0.0428 | *** |

DATA: n = 30

Two-Tailed Analysis
Table Report for Result

| | 4% sugar in muffins | 250 ppm PCS3028 in muffins | Percent Frequency | Binomial Distribution Probability | |
|---|---|---|---|---|---|
| | Sample 1 | Sample 2 | Sample 1 | P-value | Sig |
| PC Frequency | 10 33.3% | 20 66.7% | 33.3% | 0.0987 | ** |

| Ingredient list | | | |
|---|---|---|---|
| | | SUGAR | PCS-3028 |
| Dry Ingredients | BASE | Reference | 150 ppm |

-continued

| Ingredient list | | | |
|---|---|---|---|
| All Purpose Flour | 17.6600 | 17.6600 | 17.7099 |
| Whole Wheat Flour | 5.8818 | 5.8818 | 5.8818 |
| Poppy Seeds | 1.0658 | 1.0658 | 1.0658 |
| Maltodextrin - 10DE | 8.3307 | 4.3307 | 8.2807 |
| Fibersol2 | 4.1618 | 4.1618 | 4.1618 |
| Modified Starch - Inscosity 656 (Grain Products) | 4.1618 | 4.1618 | 4.1618 |
| Lemon Flavor | 0.8868 | 0.8868 | 0.8868 |
| Salt (Sodium Chloride) | 0.7486 | 0.7486 | 0.7486 |
| Baking Powder | 1.0658 | 1.0658 | 1.0658 |
| Baking Soda | 0.3208 | 0.3208 | 0.3208 |
| Sucrose | | 4.0000 | |
| PCS-3028 | | | 0.0150 |

| Wet Ingredients | BASE | Sugar Reference | PCS-3028 150 ppm |
|---|---|---|---|
| Milk, 2% | 27.2700 | 27.2700 | 27.2700 |
| Soybean Oil | 11.7635 | 11.7635 | 11.7635 |
| Whole Eggs | 8.5553 | 8.5553 | 8.5553 |
| Water | 5.3470 | 5.3470 | 5.3470 |
| Yogurt, Plain Nonfat | 1.6041 | 1.6041 | 1.6041 |
| Lemon Juice, 100% | 0.6416 | 0.6416 | 0.6416 |
| Vanilla Extract | 0.5347 | 0.5347 | 0.5347 |
| | 100 | 100 | 100 |

Example 6b

Lemon Poppy Seed Muffin with PCS-3028

Application: Baked Goods

SUMMARY

To test the contribution of PCS-3028 in baked goods, lemon flavored poppy seed muffins were baked with a 50% sugar reduced formulation with Reb A as control, and sugar reduced formulation with Reb A and *stevia* extract (PCS-3028) as a test sample. A thirty consumer panel members evaluated two samples of lemon poppy seed muffins for different attributes (lemon flavor, vanilla flavor, brown notes, and sweet). The panel found that the test samples with PCS-3028 significantly higher lemon flavor, and brown flavor intensity than the control sample (at 95% confidence).

Project Objective

The project objective is to assess if the addition of PCS-3028 has an effect on key flavor attributes in baked applications.

Test Objective

The test objective is to determine if the flavor profile of a control sample of sugar reduced lemon poppy seed muffin differs from Test samples of the same muffin containing PCS-3028.

Sample Preparation

1. Grease muffin pans or line with muffin baking cups. Preheat oven to 350° F. (175° C.).
2. In a large mixing bowl, blend dry ingredients. Make a well in the center of the bowl.
3. Add wet ingredients and mix until smooth.
4. Pour batter evenly into prepared pans. Bake for 25-30 minutes, or until a toothpick inserted into the center of the muffins comes out clean.
5. Cool in muffins in baking pan for 5 minutes then remove to a wire cooling rack.
6. Serve muffins at room temperature.

| | Reb A Control | Reb A w/ PCS-3028 |
|---|---|---|
| Dry Ingredients | | |
| Sucrose | 12.3722 | 12.3722 |
| All Purpose Flour | 17.6434 | 17.6434 |
| Whole Wheat Flour | 5.8763 | 5.8763 |
| Poppy Seeds | 1.0648 | 1.0648 |
| Maltodextrin - 10DE (Tate & Lyle) | 2.1368 | 2.1368 |
| Fibersol2 (ADM/Matsutani) | 1.0648 | 1.0648 |
| Modified Starch - Inscosity 656 (Grain Products) | 1.0648 | 1.0648 |
| Lemon Flavor - Firmenich | 0.8860 | 0.8860 |
| Salt (Sodium Chloride) | 0.7479 | 0.7479 |
| Baking Powder | 1.0648 | 1.0648 |
| Baking Soda | 0.3205 | 0.3205 |
| Reb A | 0.0200 | 0.0200 |
| PCS-3028 | | 0.0150 |
| Wet Ingredients | | |
| Milk, 2% | 27.2444 | 27.2444 |
| Soybean Oil | 11.7525 | 11.7525 |
| Whole Eggs | 8.5473 | 8.5473 |
| Water | 5.3420 | 5.3420 |
| Yogurt, Plain Nonfat | 1.6026 | 1.6026 |
| Lemon Juice, 100% | 0.6410 | 0.6410 |
| Vanilla Extract | 0.5342 | 0.5342 |

| METHODOLOGY | |
|---|---|
| Nature of Participants: | Company employees |
| Number of Sessions: | 1 |
| Number of Participants: | 30 |
| Test Design: | Balanced, randomized within pair. Blind |
| Sensory Test Method: | Intensity ratings |
| Environmental Condition | Standard booth lighting |
| Attributes and Scales: | |
| Lemon Flavor, Vanila Flavor, Brown Note, and Sweetness, aftertaste (sweet and bitter) 10-pt continuous intensity scale where 0 = Imperceptible and 10 = Extremely Pronounced | |
| Statistical Analysis: | ANOVA (by Block) with Post Hoc Duncan's Test |
| Sample Size | ~1.5 oz. in a clear capped plastic cup |
| Serving Temperature | Room temperature (~70° F.) |
| Serving/Panelists | Samples served simultaneously. Panelists |
| Instruction: | instructed to read ingredient statement, evaluate each sample. |

Results

Table 5 (below) summarizes the overall acceptance and mean attribute intensity results for each sample.

TABLE 5

Mean Scores and degree of confidence (P value)
Summary of Mean-Scores, P-Values, and Significance
Test Description: 50% Sugar Reduced Lemon Poppy Seed
Muffins with 200 ppm of Reb A vs. 150 ppm of PCS-3028
This test was performed on 30 panelists.

| Attribute | 50% SR Muffins with 200 ppm of Reb A | 50% SR Muffins with 200 ppm of Reb A and 150 ppm PCS-3028 | P-Value | Sig |
|---|---|---|---|---|
| Sweet Intensity | b 7.56 | a 7.80 | 0.1808 | * |
| Bitter Intensity | 0.85 | 0.76 | 0.2829 | NS |
| Lemon Flavor | b 3.70 | a 4.21 | 0.0202 | *** |

TABLE 5-continued

Mean Scores and degree of confidence (P value)
Summary of Mean-Scores, P-Values, and Significance
Test Description: 50% Sugar Reduced Lemon Poppy Seed
Muffins with 200 ppm of Reb A vs. 150 ppm of PCS-3028
This test was performed on 30 panelists.

| Attribute | 50% SR Muffins with 200 ppm of Reb A | 50% SR Muffins with 200 ppm of Reb A and 150 ppm PCS-3028 | P-Value | Sig |
|---|---|---|---|---|
| Brown Note | b | a | 0.0147 | *** |
| | 1.99 | 2.45 | | |
| Vanilla Flavor | 1.22 | 1.41 | 0.3233 | NS |
| Sweet Aftertaste | 2.38 | 2.29 | 0.5064 | NS |
| Bitter Aftertaste | 0.45 | 0.49 | 0.6803 | NS |
| Overall Liking | b | a | 0.1107 | * |
| | 6.39 | 6.56 | | |

\* = 80% CI,
\*\* = 90% CI,
\*\*\* = 95% CI

The Test samples with PCS-3028 had significantly higher lemon flavor, and brown flavor intensity than the Control sample (95% confidence).

Example 6 Conclusion

To test the contribution of PCS-3028 in baked goods, lemon flavored poppy seed muffins were baked with a sugar reduced formulation with Reb A as control, and sugar reduced formulation with Reb A and *stevia* extract (PCS-3028) as a test sample. A thirty consumer panel members evaluated two samples of lemon poppy seed muffins for different attributes (lemon flavor, vanilla flavor, brown notes, and sweet). The panel found that the Test samples with PCS-3028 had significantly higher lemon flavor, and brown flavor intensity than the control sample (at 95% confidence).

Example 7

Barbeque Flavored Peanut with PCS-3028
Application: Snack Food/Seasoning/Nut Product

SUMMARY

Roasted Peanuts were used for testing the modification of flavor profile by the PCS-3028. The two samples included: 1) a 50% sugar reduced control sample containing Reb A, 2) a 50% reduced sugar test sample containing Reb A and PCS-3028.

Thirty consumer panel members evaluated two samples of the peanuts for overall acceptance and attribute intensities (overall flavor, saltiness, sweetness, smoke flavor, spice/heat intensity, peanut flavor, chili powder flavor, bitterness and lingering sweet aftertaste intensity). The objective of the test was to determine if the addition of PCS-3028 affects the flavor profile of a savory snack food. The results indicated:

Test sample had significantly less bitterness and lower aftertaste (sweet and bitter) than the Control sample (at 90% and 95% confidence respectively).

Project Objective

The project objective is to assess if the addition of *stevia* extract solids has an effect on key flavor attributes in various applications.

Test Objective

The test objective is to determine if the flavor profile and overall acceptance of a Control sample of barbeque flavored peanuts (containing no *stevia* extract solids) differs from a Test sample of the same snack food (containing *stevia* extract solids).

METHODOLOGY

| | |
|---|---|
| Nature of Participants: | Company employees |
| Number of Sessions | 1 |
| Number of Participants: | 30 |
| Test Design: | Balanced, randomized within pair. Blind |
| Sensory Test Method: | Intensity and acceptance ratings |
| Environmental Condition | Standard booth lighting |
| Attributes and Scales: | |
| Overall Acceptance on a 10-pt hedonic scale where 10 + Extremely Like and 0 = Extremely Dislike | |
| Overall Flavor, Saltiness, Sweetness, Smoke Intensity, Heat/spice intensity, peanut flavor, chili powder and Aftertaste Intensity (sweet and bitter) on a 10-pt continuous intensity scale where 0 = Imperceptible and 10 = Extremely Pronounced | |
| Statistical Analysis: | ANOVA (by Block) with Post Hoc Duncan's Test |
| Sample Size | ~1.5 oz. in a clear capped plastic cup |
| Serving Temperature | Room temperature |
| Serving/Panelists | Samples served simultaneously. Panelists |
| Instruction: | instructed to read ingredient statement, evaluate each sample. |

SAMPLE PREPARATION

Mix peanuts with liquid ingredients, until peanuts are completely coated.

Blend dry ingredients with Reb A and the test ingredient (PCS 5001).

Add to the peanuts and mix well until they are fully coated.

Serve at room temperature in 1 oz cups.

| SAMPLES | | |
|---|---|---|
| | Reb A | Reb A + PCS3028 |
| Unsalted Peanuts | 86.812 | 86.7277 |
| Vegetable oil | 2.934 | 2.934 |
| Sugar | 5.876 | 5.876 |
| Salt | 2.934 | 2.934 |
| Chilli powder | 0.173 | 0.173 |
| Cumin powder | 0.286 | 0.286 |
| Garlic powder | 0.156 | 0.156 |
| Cayenne pepper | 0.156 | 0.156 |
| Smoke liquid | 0.729 | 0.729 |
| Reb A | 0.0243 | 0.0243 |
| PCS-3028 | | 0.0040 |
| Total wt. (g) | 100 | 100 |

Results

Table 6 (below) summarizes the overall acceptance and mean attribute intensity results for each sample.

TABLE 6

Mean Scores
Summary of Mean-Scores, P-Vaules, and Significance
Test Description: 50% SR BBQ Peanuts w/PCS-3028 at 40 ppm
This test was performed on 31 panelists.

| Attribute | 50% SR control BBQ peanuts | 50% SR w/PCS-3028 at 40 ppm BBQ peanuts | P-Value | Sig |
|---|---|---|---|---|
| Sweet Intensity | 3.95 | 4.09 | 0.6444 | NS |
| Saltiness | 5.23 | 5.10 | 0.6366 | NS |
| Smoked Flavor | 2.30 | 2.48 | 0.4667 | NS |
| Heat/Spice | 1.57 | 1.41 | 0.4026 | NS |
| Peanut Flavor | 7.61 | 7.74 | 0.2933 | NS |
| Chilli Powder | 3.12 | 3.19 | 0.6781 | NS |
| Bitterness | a 1.07 | b 0.85 | 0.0719 | ** |
| Bitter Aftertaste | a 0.86 | b 0.60 | 0.0291 | *** |
| Sweet Aftertaste | a 1.85 | b 1.45 | 0.0395 | *** |
| Overall Liking | b 5.66 | a 4.96 | 0.1986 | * |

* = 80% CI,
** = 90% CI,
*** = 95% CI

Test sample had significantly less bitterness and lower aftertaste (sweet and bitter) than the Control sample (at 90% and 95% confidence respectively).

Example 7 Conclusion

Thirty consumer panel members evaluated two samples of the peanuts for overall acceptance and attribute intensities (overall flavor, saltiness, sweetness, smoke flavor, spice/heat intensity, peanut flavor, chili powder flavor, bitterness and lingering sweet aftertaste intensity). The objective of the test was to determine if the addition of PCS-3028 affects the flavor profile of a savory snack food. The results indicated Test sample had significantly less bitterness and lower aftertaste (sweet and bitter) than the Control sample (at 90% and 95% confidence respectively).

Example 8

Alcoholic Beverage—Moscow Mule with PCS-3028
Application: Alcoholic Beverage

SUMMARY

Thirty company employees evaluated two samples of alcoholic beverage for overall acceptance and attribute intensities. The two samples included: 1) Moscow mule— Control and 2) Moscow Mule test sample containing PCS-3028. The objective of the test was to determine if the addition of PCS-3028 affects the flavor profile of an alcoholic beverage. The results indicated the Test sample PCS-3028 had significantly higher ginger and alcohol note compared to the control samples (at 95% confidence).
Project Objective
The project objective is to assess if the addition of *stevia* extract solids has an effect on key flavor attributes in alcoholic beverage applications.

Test Objective

The test objective is to determine if the flavor profile and overall acceptance of a Control sample of alcoholic beverage differs from a Test sample of the same beverage containing PCS-3028.

METHODOLOGY

| | |
|---|---|
| Nature of Participants: | Company employees |
| Number of Sessions | 1 |
| Number of Participants: | 30 |
| Test Design: | Balanced, randomized within pair. Blind |
| Sensory Test Method: | Intensity and acceptance ratings |
| Environmental Condition | Standard booth lighting |
| Attributes and Scales: | |
| | Overall Acceptance on a 10-pt hedonic scale where 10 + Extremely Like and 0 = Extremely Dislike |
| | Overall Liking, Sweetness, Bitterness, Ginger, Llime, Alcohol, and Aftertaste (Sweet, bitter, and Alcohol). 10-pt continuous intensity scale where 0 = Imperceptible and 10 = Extremely Pronounced |
| Statistical Analysis: | ANOVA (by Block) with Post Hoc Duncan's Test |
| Sample Size | ~1.5 oz. in a clear capped plastic cup |
| Serving Temperature | Refrigerated temperature (~45° F.) |
| Serving/Panelists | Samples served simultaneously. Panelists |
| Instruction: | instructed to read ingredient statement, evaluate each sample. |

Samples

Ingredient list

| | Moscow Mule | 50 ppm in Moscow Mule |
|---|---|---|
| Mule 20, Moscow Mule | 100 | 99.995 |
| PCS-3028 | | 0.0050 |
| TOTAL | 100 | 100 |

*Mule 20, Moscow Mule, 8% alcohol/volume

Results

Table 7 (below) summarizes the overall acceptance and mean attribute intensity results for each sample.

TABLE 7

Mean Scores
Summary of Mean-Scores, P-Values, and Significance
Test Description: Moscow Mule Pre-Mixed 8%
The test was performed on 34 panelists.

| Attribute | Moscow Mule Pre-Mixed 8% Alcohol Control | Moscow Mule Pre-Mixed 8% Alcohol w/ PCS3028 @ 50 ppm | P-Value | Sig |
|---|---|---|---|---|
| Sweet Intensity | b 5.78 | a 6.13 | 0.1052 | * |
| Bitted Intensity | 4.08 | 4.00 | 0.6238 | NS |
| Ginger Flavor | b 2.97 | a 3.61 | 0.0173 | *** |
| Lime Flavor | 1.21 | 1.15 | 0.6304 | NS |
| Alcohol Note | b 6.41 | a 7.06 | 0.0438 | *** |

TABLE 7-continued

Mean Scores
Summary of Mean-Scores, P-Values, and Significance
Test Description: Moscow Mule Pre-Mixed 8%
The test was performed on 34 panelists.

| Attribute | Moscow Mule Pre-Mixed 8% Alcohol Control | Moscow Mule Pre-Mixed 8% Alcohol w/ PCS3028 @ 50 ppm | P-Value | Sig |
|---|---|---|---|---|
| Sweet Aftertaste | 2.46 | 2.34 | 0.3686 | NS |
| Bitter Aftertaste | 1.86 | 1.86 | 1.0000 | NS |
| Alcohol Aftertaste | 3.00 | 2.85 | 0.5491 | NS |
| Overall Liking | 5.40 | 5.68 | 0.2230 | NS |

\* = 80% CI,
\*\* = 90% CI,
\*\*\* = 95% CI

The results indicated the Test sample PCS-3028 had significantly higher ginger flavor, and alcohol note compared to the control samples (at 95% confidence).

Example 8 Conclusion

Thirty company employees evaluated two samples of alcoholic beverage for overall acceptance and attribute intensities. The two samples included: 1) Moscow mule—Control and 2) Moscow Mule test sample containing PCS-3028. The objective of the test was to determine if the addition of PCS-3028 affects the flavor profile of an alcoholic beverage. The results indicated the Test sample PCS-3028 had significantly higher ginger and alcohol note compared to the control samples (at 95% confidence).

Example 9

Application: Breakfast Cereal
To estimate the sweetness threshold perception of PCS-3028 in breakfast cereal, puffed corn cereal was made and sweetened with 3.0% sugar (control) or with PCS-3028 (test sample). As recommended by the FEMA Sensory guidance document,—Guidance for the Sensory Testing of Flavorings with Modifying Properties, within the FEMA GRAS™ Program, 2013—the recognition threshold concentration was determined using 2-alternateve forced choice (2-AFC) methodology.

A consumer panel (N=30) tested control (3.0% sugar) and test samples containing 150 ppm PCS-3028 in a puffed corn cereal and found that control sample was significantly sweeter than test samples containing 150 ppm PCS-3028.

Therefore, it is proposed that the average maximum level be 150 ppm of PCS-3028 for the breakfast cereal product category.

Example 9a

Sweetness Perception Threshold of PCS-3028 in Breakfast Cereal
Application: Breakfast Cereal

SUMMARY

The sweetness perception of 3.0% sugar and 150 ppms of PCS-3028 added a low sugar cereal was tested with a consumer panel and found that 150 ppm of PCS-3028 added to a low sugar cereal provided sweetness perception that was significantly less sweet than 3.0% sugar added to the low sugar cereal.

| METHODOLOGY | |
|---|---|
| Nature of Participants: | Company employees |
| Number of Sessions | 1 |
| Number of Participants: | ≥30 |
| Test Design: | 2- AFC, Balanced, randomized within pair. Blind |
| Sensory Test Method: | Intensity ratings |
| Environmental Condition | Standard booth lighting |
| Attributes and Scales: | Which sample is sweeter? |
| Statistical Analysis: | Paired comparison Test |
| Sample Size | ~1.5 oz. in a clear capped plastic cup |
| Serving Temperature | Room Temperature |
| Serving/Panelists | Samples served simultaneously. Panelists |
| Instruction: | instructed to read ingredient statement, evaluate each sample. |

This is an evaluation of the recognition threshold concentration to follow methodology outlined in section 1.4.2 of the "Guidance for the Sensory Testing of Flavorings with Modifying Properties within the FEMA GRAS™ Program".

DATA: n = 30
Two-Tailed Analysis Table Report for Result

| | Puffed Corn Cereal + 8% Sugar | Puffed Corn Cereal + 150 ppm PCS-3028 | Percent Frequency Sample 1 | P-value | Sig |
|---|---|---|---|---|---|
| PC | 28 | 2 | 93.3% | 0.00 | \*\*\* |
| % Frequency Analysis: | 93.3 | 6.7 | | | |

DATA: n = 30
Two-Tailed Analysis Table Report for Result

| | Puffed Corn Cereal + 8% Sugar | Puffed Corn Cereal + 250 ppm PCS-3028 | Percent Frequency Sample 1 | P-value | Sig |
|---|---|---|---|---|---|
| PC | 13 | 17 | 43.3 | 0.5847 | |
| % Frequency Analysis: | 43.3 | 56.7 | | | |

Sample Preparation: The puffed corn cereal (with no added sugar or flavor) purchased from local stores and sprayed with aqueous sucrose solutions using a portable atomizer to create a fine mist while tumbling the dry cereal grains. All the samples were dried to remove the added water from the samples. About 3 g of cereal was portioned into appropriately labeled blind-coded plastic 2 oz soufflé cup with lids. Samples were served dry to all panelists.

Example 9b

Breakfast Cereal with PCS-3028
Application: Breakfast Cereal

SUMMARY

To evaluate the contribution of PCS-3028 in breakfast cereal, two vanilla flavored corn puff cereal samples were prepared and tested by a consumer panel of thirty company employees. The employee panel evaluated the samples of breakfast cereal for overall acceptance and attribute intensities (corn, vanilla, brown, sweetness, bitterness, and aftertaste). The two samples included: 1) Control of vanilla flavored corn puffs and 2) Test sample of vanilla flavored corn puffs with 150 ppm PCS-3028. The panel found the test sample containing 150 ppm of PCS-3028 to be significantly higher in corn puffs, vanilla, brown, overall liking than the control (at 95% confidence). Additionally, results showed significantly higher sweet aftertaste (at 90% confidence).

Project Objective

The project objective is to assess if the addition of *stevia* extract solids has an effect on key flavor attributes in various food applications.

Test Objective

The test objective is to determine if the flavor profile of a control sample of breakfast cereal differs from a Test sample of the same cereal containing PCS-3028.

Samples

Breakfast Cereal

| Corn Puff Caramel Flavored | | |
|---|---|---|
| | Reference | PCS-3028 |
| *Corn Puff Dry Cereal | 93.9 | 93.885 |
| Sugar | 6 | 6 |
| Oil | 0.1 | 0.1 |
| PCS-3028 | | 0.015 |
| Total (g) | 100 | 100 |

*Arrowhead Mills brand

Bake at 200 F., 8 minutes

| | Sugar slurry |
|---|---|
| water | 72.8 |
| sugar | 120 |
| oil | 0.2 |
| Vanilla Flavor | 7 |
| Total g | 200 |

*Use 10 g of slurry to make 100 gr of final product.

| METHODOLOGY | |
|---|---|
| Nature of Participants: | Company employees |
| Number of Sessions | 1 |
| Number of Participants: | 30 |
| Test Design: | Balanced, randomized within pair. Blind |
| Sensory Test Method: | Intensity and acceptance ratings |
| Environmental Condition | Standard booth lighting |
| Attributes and Scales: | |
| Overall Acceptance on a 10-pt hedonic scale where 10 + Extremely Like and 0 = Extremely Dislike | |
| Overall Liking, Corn, brown note, vanilla flavor, sweetness, bitterness, and aftertaste. 10-pt continuous intensity scale where 0 = Imperceptible and 10 = Extremely Pronounced | |
| Statistical Analysis: | ANOVA (by Block) with Post Hoc Duncan's Test |
| Sample Size | ~1.5 oz. in a clear capped plastic cup |
| Serving Temperature | Room temperature |
| Serving/Panelists | Samples served simultaneously. Panelists |
| Instruction: | instructed to read ingredient statement, evaluate each sample. |

Results

Table 8 (below) summarizes the overall acceptance and mean attribute intensity results for each sample.

TABLE 8

Mean Scores
Summary of Mean-Scores, P-Values, and Significance
Test Description: Vanilla Corn puffs cereal with
6% Sucrose vs. 6% Sucrose and PCS-3028 at 150 ppm
This test was performed on 30 panelists.

| Attribute | 6% Sucrose Only | 6% Sucrose with 150 ppm of PCS-3028 | P-Value | Sig |
|---|---|---|---|---|
| Sweet Intensity | 2.16 | 2.14 | 0.9321 | NS |
| Bitted Intensity | 0.19 | 0.16 | 0.5349 | NS |
| Vanilla Flavor | b 2.32 | a 3.31 | 0.0168 | *** |
| Brown Note | b 3.57 | a 4.50 | 0.0131 | *** |
| Corn Flavor | b 6.04 | a 7.00 | 0.0236 | *** |
| Sweet Aftertaste | b 0.92 | a 1.22 | 0.0662 | ** |
| Bitter Aftertaste | 0.47 | 0.38 | 0.2726 | NS |
| Overall Liking | b 4.81 | a 5.56 | 0.0045 | *** |

*= 80% CI,
** = 90% CI,
*** = 95% CI

The panel found the test sample containing 150 ppm of PCS-3028 to be significantly higher in corn, vanilla, brown, and overall liking than the control (at 95% confidence).

Additionally, results showed significantly higher sweet aftertaste (at 90% confidence).

Example 9 Conclusion

To evaluate the contribution of PCS-3028 in breakfast cereal, two vanilla flavored corn puff cereal samples were prepared and tested by a consumer panel of thirty company employees. The employee panel evaluated the samples of breakfast cereal for overall acceptance and attribute intensities (corn, vanilla, brown, sweetness, bitterness, and aftertaste). The two samples included: 1) Control of vanilla flavored corn puffs and 2) Test sample of vanilla flavored corn puffs with 150 ppm PCS-3028. The panel found the test sample containing 150 ppm of PCS-3028 to be significantly higher in corn puffs, vanilla, brown, overall liking than the control (at 95% confidence). Additionally, results showed significantly higher sweet aftertaste (at 90% confidence).

Although the invention and its advantages have been described in detail, it should be understood that various changes, substitutions and alterations can be made herein without departing from the spirit and scope of the invention as defined by the appended claims. Moreover, the scope of the application is not intended to be limited to the particular embodiments of the invention described in the specification. As one of ordinary skill in the art will readily appreciate from the disclosure of the invention, the compositions, processes, methods, and steps, presently existing or later to be developed that perform substantially the same function or achieve substantially the same result as the corresponding embodiments described herein may be utilized according to the invention.

We claim:

1. A *stevia* flavor composition comprising rebaudioside AM (Reb AM) and rebaudioside M (Reb M), wherein the ratio of rebaudioside AM to rebaudioside M is about 3:1 to 5:1 on a dry weight basis.

2. The composition of claim 1, further comprising other steviol glycosides.

3. The *stevia* flavor composition of claim 1, wherein the composition is used in a beverage selected from the group consisting of carbonated soft drinks, non-carbonated beverages, alcoholic beverages, fruit juices, flavored water, and energy drinks.

4. The *stevia* flavor composition of claim 1, wherein the composition is used in a food product selected from the group consisting of baked goods, dairy products, confectionery, cereals, and sauces.

5. The *stevia* flavor composition of claim 1, wherein the composition further comprises a natural flavor enhancer selected from the group consisting of vanilla extract, cinnamon extract, and citrus extract.

6. The *stevia* flavor composition of claim 1, wherein the ratio of rebaudioside AM to rebaudioside M is about 4:1.

* * * * *

SEQUENCE LISTING

<160> NUMBER OF SEQ ID NOS: 3

<210> SEQ ID NO 1
<211> LENGTH: 808
<212> TYPE: PRT
<213> ORGANISM: Arabidopsis thaliana

<400> SEQUENCE: 1

```
Met Ala Asn Ala Glu Arg Met Ile Thr Arg Val His Ser Gln Arg Glu
1               5                   10                  15

Arg Leu Asn Glu Thr Leu Val Ser Glu Arg Asn Glu Val Leu Ala Leu
            20                  25                  30

Leu Ser Arg Val Glu Ala Lys Gly Lys Gly Ile Leu Gln Gln Asn Gln
        35                  40                  45

Ile Ile Ala Glu Phe Glu Ala Leu Pro Glu Gln Thr Arg Lys Lys Leu
    50                  55                  60

Glu Gly Gly Pro Phe Phe Asp Leu Leu Lys Ser Thr Gln Glu Ala Ile
65                  70                  75                  80

Val Leu Pro Pro Trp Val Ala Leu Ala Val Arg Pro Arg Pro Gly Val
                85                  90                  95

Trp Glu Tyr Leu Arg Val Asn Leu His Ala Leu Val Val Glu Glu Leu
            100                 105                 110

Gln Pro Ala Glu Phe Leu His Phe Lys Glu Glu Leu Val Asp Gly Val
            115                 120                 125

Lys Asn Gly Asn Phe Thr Leu Glu Leu Asp Phe Glu Pro Phe Asn Ala
        130                 135                 140

Ser Ile Pro Arg Pro Thr Leu His Lys Tyr Ile Gly Asn Gly Val Asp
145                 150                 155                 160

Phe Leu Asn Arg His Leu Ser Ala Lys Leu Phe His Asp Lys Glu Ser
            165                 170                 175

Leu Leu Pro Leu Leu Asp Phe Leu Arg Leu His Ser His Gln Gly Lys
            180                 185                 190

Asn Leu Met Leu Ser Glu Lys Ile Gln Asn Leu Asn Thr Leu Gln His
            195                 200                 205

Thr Leu Arg Lys Ala Glu Glu Tyr Leu Ala Glu Leu Lys Ser Glu Thr
    210                 215                 220

Leu Tyr Glu Glu Phe Glu Ala Lys Phe Glu Glu Ile Gly Leu Glu Arg
225                 230                 235                 240

Gly Trp Gly Asp Asn Ala Glu Arg Val Leu Asp Met Ile Arg Leu Leu
            245                 250                 255

Leu Asp Leu Leu Glu Ala Pro Asp Pro Ser Thr Leu Glu Thr Phe Leu
            260                 265                 270

Gly Arg Val Pro Met Val Phe Asn Val Val Ile Leu Ser Pro His Gly
            275                 280                 285

Tyr Phe Ala Gln Asp Asn Val Leu Gly Tyr Pro Asp Thr Gly Gly Gln
    290                 295                 300

Val Val Tyr Ile Leu Asp Gln Val Arg Ala Leu Glu Ile Glu Met Leu
305                 310                 315                 320

Gln Arg Ile Lys Gln Gln Gly Leu Asn Ile Lys Pro Arg Ile Leu Ile
            325                 330                 335

Leu Thr Arg Leu Leu Pro Asp Ala Val Gly Thr Thr Cys Gly Glu Arg
            340                 345                 350

Leu Glu Arg Val Tyr Asp Ser Glu Tyr Cys Asp Ile Leu Arg Val Pro
            355                 360                 365
```

```
Phe Arg Thr Glu Lys Gly Ile Val Arg Lys Trp Ile Ser Arg Phe Glu
    370             375                 380

Val Trp Pro Tyr Leu Glu Thr Tyr Thr Glu Asp Ala Ala Val Glu Leu
385             390                 395                 400

Ser Lys Glu Leu Asn Gly Lys Pro Asp Leu Ile Ile Gly Asn Tyr Ser
                405                 410                 415

Asp Gly Asn Leu Val Ala Ser Leu Leu Ala His Lys Leu Gly Val Thr
                420             425                 430

Gln Cys Thr Ile Ala His Ala Leu Glu Lys Thr Lys Tyr Pro Asp Ser
            435             440                 445

Asp Ile Tyr Trp Lys Lys Leu Asp Asp Lys Tyr His Phe Ser Cys Gln
    450             455                 460

Phe Thr Ala Asp Ile Phe Ala Met Asn His Thr Asp Phe Ile Ile Thr
465             470                 475                 480

Ser Thr Phe Gln Glu Ile Ala Gly Ser Lys Glu Thr Val Gly Gln Tyr
                485                 490                 495

Glu Ser His Thr Ala Phe Thr Leu Pro Gly Leu Tyr Arg Val Val His
            500             505                 510

Gly Ile Asp Val Phe Asp Pro Lys Phe Asn Ile Val Ser Pro Gly Ala
            515             520                 525

Asp Met Ser Ile Tyr Phe Pro Tyr Thr Glu Glu Lys Arg Arg Leu Thr
            530             535                 540

Lys Phe His Ser Glu Ile Glu Glu Leu Leu Tyr Ser Asp Val Glu Asn
545             550                 555                 560

Asp Glu His Leu Cys Val Leu Lys Asp Lys Lys Lys Pro Ile Leu Phe
                565                 570                 575

Thr Met Ala Arg Leu Asp Arg Val Lys Asn Leu Ser Gly Leu Val Glu
            580             585                 590

Trp Tyr Gly Lys Asn Thr Arg Leu Arg Glu Leu Val Asn Leu Val Val
            595             600                 605

Val Gly Gly Asp Arg Arg Lys Glu Ser Lys Asp Asn Glu Glu Lys Ala
    610             615                 620

Glu Met Lys Lys Met Tyr Asp Leu Ile Glu Glu Tyr Lys Leu Asn Gly
625             630                 635                 640

Gln Phe Arg Trp Ile Ser Ser Gln Met Asp Arg Val Arg Asn Gly Glu
                645             650                 655

Leu Tyr Arg Tyr Ile Cys Asp Thr Lys Gly Ala Phe Val Gln Pro Ala
            660             665                 670

Leu Tyr Glu Ala Phe Gly Leu Thr Val Val Glu Ala Met Thr Cys Gly
            675             680                 685

Leu Pro Thr Phe Ala Thr Cys Lys Gly Gly Pro Ala Glu Ile Ile Val
            690             695                 700

His Gly Lys Ser Gly Phe His Ile Asp Pro Tyr His Gly Asp Gln Ala
705             710                 715                 720

Ala Asp Leu Leu Ala Asp Phe Phe Thr Lys Cys Lys Glu Asp Pro Ser
                725             730                 735

His Trp Asp Glu Ile Ser Lys Gly Gly Leu Gln Arg Ile Glu Glu Lys
            740             745                 750

Tyr Thr Trp Gln Ile Tyr Ser Gln Arg Leu Leu Thr Leu Thr Gly Val
            755             760                 765

Tyr Gly Phe Trp Lys His Val Ser Asn Leu Asp Arg Leu Glu His Arg
    770             775                 780

Arg Tyr Leu Glu Met Phe Tyr Ala Leu Lys Tyr Arg Pro Leu Ala Gln
```

-continued

```
785                 790                 795                 800

Ala Val Pro Leu Ala Gln Asp Asp
                805

<210> SEQ ID NO 2
<211> LENGTH: 442
<212> TYPE: PRT
<213> ORGANISM: Solanum lycopersicum

<400> SEQUENCE: 2

Met Ala Thr Asn Leu Arg Val Leu Met Phe Pro Trp Leu Ala Tyr Gly
1               5                   10                  15

His Ile Ser Pro Phe Leu Asn Ile Ala Lys Gln Leu Ala Asp Arg Gly
            20                  25                  30

Phe Leu Ile Tyr Leu Cys Ser Thr Arg Ile Asn Leu Glu Ser Ile Ile
            35                  40                  45

Lys Lys Ile Pro Glu Lys Tyr Ala Asp Ser Ile His Leu Ile Glu Leu
        50                  55                  60

Gln Leu Pro Glu Leu Pro Glu Leu Pro Pro His Tyr His Thr Thr Asn
65                  70                  75                  80

Gly Leu Pro Pro His Leu Asn Pro Thr Leu His Lys Ala Leu Lys Met
                85                  90                  95

Ser Lys Pro Asn Phe Ser Arg Ile Leu Gln Asn Leu Lys Pro Asp Leu
            100                 105                 110

Leu Ile Tyr Asp Val Leu Gln Pro Trp Ala Glu His Val Ala Asn Glu
            115                 120                 125

Gln Gly Ile Pro Ala Gly Lys Leu Leu Val Ser Cys Ala Ala Val Phe
        130                 135                 140

Ser Tyr Phe Phe Ser Phe Arg Lys Asn Pro Gly Val Glu Phe Pro Phe
145                 150                 155                 160

Pro Ala Ile His Leu Pro Glu Val Glu Lys Val Lys Ile Arg Glu Ile
            165                 170                 175

Leu Ala Lys Glu Pro Glu Glu Gly Gly Arg Leu Asp Glu Gly Asn Lys
            180                 185                 190

Gln Met Met Leu Met Cys Thr Ser Arg Thr Ile Glu Ala Lys Tyr Ile
            195                 200                 205

Asp Tyr Cys Thr Glu Leu Cys Asn Trp Lys Val Val Pro Val Gly Pro
        210                 215                 220

Pro Phe Gln Asp Leu Ile Thr Asn Asp Ala Asp Asn Lys Glu Leu Ile
225                 230                 235                 240

Asp Trp Leu Gly Thr Lys Pro Glu Asn Ser Thr Val Phe Val Ser Phe
                245                 250                 255

Gly Ser Glu Tyr Phe Leu Ser Lys Glu Asp Met Glu Glu Ile Ala Phe
            260                 265                 270

Ala Leu Glu Ala Ser Asn Val Asn Phe Ile Trp Val Val Arg Phe Pro
            275                 280                 285

Lys Gly Glu Glu Arg Asn Leu Glu Asp Ala Leu Pro Glu Gly Phe Leu
        290                 295                 300

Glu Arg Ile Gly Glu Arg Gly Arg Val Leu Asp Lys Phe Ala Pro Gln
305                 310                 315                 320

Pro Arg Ile Leu Asn His Pro Ser Thr Gly Gly Phe Ile Ser His Cys
                325                 330                 335

Gly Trp Asn Ser Val Met Glu Ser Ile Asp Phe Gly Val Pro Ile Ile
            340                 345                 350
```

```
Ala Met Pro Ile His Asn Asp Gln Pro Ile Asn Ala Lys Leu Met Val
        355                 360                 365

Glu Leu Gly Val Ala Val Glu Ile Val Arg Asp Asp Gly Lys Ile
        370                 375                 380

His Arg Gly Glu Ile Ala Glu Ala Leu Lys Ser Val Val Thr Gly Glu
385                 390                 395                 400

Thr Gly Glu Ile Leu Arg Ala Lys Val Arg Glu Ile Ser Lys Asn Leu
                405                 410                 415

Lys Ser Ile Arg Asp Glu Glu Met Asp Ala Val Ala Glu Glu Leu Ile
                420                 425                 430

Gln Leu Cys Arg Asn Ser Asn Lys Ser Lys
        435                 440

<210> SEQ ID NO 3
<211> LENGTH: 458
<212> TYPE: PRT
<213> ORGANISM: Stevia rebaudiana

<400> SEQUENCE: 3

Met Glu Asn Lys Thr Glu Thr Thr Val Arg Arg Arg Arg Ile Ile
1               5                   10                  15

Leu Phe Pro Val Pro Phe Gln Gly His Ile Asn Pro Ile Leu Gln Leu
                20                  25                  30

Ala Asn Val Leu Tyr Ser Lys Gly Phe Ala Ile Thr Ile Leu His Thr
        35                  40                  45

Asn Phe Asn Lys Pro Lys Thr Ser Asn Tyr Pro His Phe Thr Phe Arg
        50                  55                  60

Phe Ile Leu Asp Asn Asp Pro Gln Asp Glu Arg Ile Ser Asn Leu Pro
65                  70                  75                  80

Thr His Gly Pro Leu Ala Gly Met Arg Ile Pro Ile Ile Asn Glu His
                85                  90                  95

Gly Ala Asp Glu Leu Arg Arg Glu Leu Glu Leu Leu Met Leu Ala Ser
                100                 105                 110

Glu Glu Asp Glu Glu Val Ser Cys Leu Ile Thr Asp Ala Leu Trp Tyr
        115                 120                 125

Phe Ala Gln Asp Val Ala Asp Ser Leu Asn Leu Arg Arg Leu Val Leu
        130                 135                 140

Met Thr Ser Ser Leu Phe Asn Phe His Ala His Val Ser Leu Pro Gln
145                 150                 155                 160

Phe Asp Glu Leu Gly Tyr Leu Asp Pro Asp Asp Lys Thr Arg Leu Glu
                165                 170                 175

Glu Gln Ala Ser Gly Phe Pro Met Leu Lys Val Lys Asp Ile Lys Ser
        180                 185                 190

Ala Tyr Ser Asn Trp Gln Ile Gly Lys Glu Ile Leu Gly Lys Met Ile
        195                 200                 205

Lys Gln Thr Lys Ala Ser Ser Gly Val Ile Trp Asn Ser Phe Lys Glu
        210                 215                 220

Leu Glu Glu Ser Glu Leu Glu Thr Val Ile Arg Glu Ile Pro Ala Pro
225                 230                 235                 240

Ser Phe Leu Ile Pro Leu Pro Lys His Leu Thr Ala Ser Ser Ser Ser
                245                 250                 255

Leu Leu Asp His Asp Arg Thr Val Phe Glu Trp Leu Asp Gln Gln Ala
                260                 265                 270

Pro Ser Ser Val Leu Tyr Val Ser Phe Gly Ser Thr Ser Glu Val Asp
        275                 280                 285
```

-continued

```
Glu Lys Asp Phe Leu Glu Ile Ala Arg Gly Leu Val Asp Ser Gly Gln
    290                 295                 300

Ser Phe Leu Trp Val Val Arg Pro Gly Phe Val Lys Gly Ser Thr Trp
305             310                 315                     320

Val Glu Pro Leu Pro Asp Gly Phe Leu Gly Glu Arg Gly Lys Ile Val
                325                 330                 335

Lys Trp Val Pro Gln Gln Glu Val Leu Ala His Pro Ala Ile Gly Ala
                340                 345                 350

Phe Trp Thr His Ser Gly Trp Asn Ser Thr Leu Glu Ser Val Cys Glu
            355                 360                 365

Gly Val Pro Met Ile Phe Ser Ser Phe Gly Gly Asp Gln Pro Leu Asn
    370                 375                 380

Ala Arg Tyr Met Ser Asp Val Leu Arg Val Gly Val Tyr Leu Glu Asn
385                 390                 395                 400

Gly Trp Glu Arg Gly Glu Val Val Asn Ala Ile Arg Arg Val Met Val
            405                 410                 415

Asp Glu Glu Gly Glu Tyr Ile Arg Gln Asn Ala Arg Val Leu Lys Gln
            420                 425                 430

Lys Ala Asp Val Ser Leu Met Lys Gly Gly Ser Ser Tyr Glu Ser Leu
            435                 440                 445

Glu Ser Leu Val Ser Tyr Ile Ser Ser Leu
    450                 455
```